(12) United States Patent
Dietrich et al.

(10) Patent No.: US 8,843,637 B2
(45) Date of Patent: Sep. 23, 2014

(54) MANAGED PEER-TO-PEER CONTENT BACKUP SERVICE SYSTEM AND METHOD USING DYNAMIC CONTENT DISPERSAL TO PLURAL STORAGE NODES

(76) Inventors: Bradley W. Dietrich, San Francisco, CA (US); Jed Putterman, San Francisco, CA (US); Daniel Putterman, San Francisco, CA (US)

( * ) Notice: Subject to any disclaimer, the term of this patent is extended or adjusted under 35 U.S.C. 154(b) by 0 days.

(21) Appl. No.: 13/411,342

(22) Filed: Mar. 2, 2012

(65) Prior Publication Data

US 2012/0173673 A1 Jul. 5, 2012

Related U.S. Application Data

(63) Continuation of application No. 11/643,018, filed on Dec. 19, 2006, now abandoned.

(51) Int. Cl.
| | |
|---|---|
| *G06F 15/173* | (2006.01) |
| *H04L 29/06* | (2006.01) |
| *G06F 17/30* | (2006.01) |
| *H04L 29/08* | (2006.01) |

(52) U.S. Cl.
CPC ........ *G06F 17/30206* (2013.01); *H04L 63/104* (2013.01); *H04L 67/104* (2013.01); *H04L 67/1076* (2013.01)
USPC ........................................................ 709/226

(58) Field of Classification Search
None
See application file for complete search history.

(56) References Cited

U.S. PATENT DOCUMENTS

2002/0059425 A1 * 5/2002 Belfiore et al. ............... 709/226

\* cited by examiner

*Primary Examiner* — Peling Shaw
(74) *Attorney, Agent, or Firm* — Law Offices of John Stattler, PC

(57) ABSTRACT

Systems, method, computer program stored on computer readable media, and business method for providing and operating a distributed network based secure storage of business or consumer digital data or content. System, method, computer program stored on computer readable media and business model for dynamically managed peer-to-peer media content backup that uses a plurality of subscriber personal computer based storage devices to store backups of other subscriber data in a manner that is secure and redundant.

18 Claims, 7 Drawing Sheets

MANAGED PEER-TO-PEER CONTENT BACKUP SERVICE SYSTEM AND METHOD USING DYNAMIC CONTENT DISPERSAL TO PLURAL STORAGE NODES

RELATED APPLICATION

The present application claims, under 35 U.S.C. 120, benefit and priority to and is a continuation of U.S. patent application Ser. No. 11/643,018, filed Dec. 19, 2006 now abandoned and entitled "Managed Peer-to-Peer Content Backup Service System and Method Using Dynamic Content Dispersal to Plural Storage Nodes," which is expressly incorporated herein by reference in its entirety.

FIELD OF THE INVENTION

This invention pertains generally systems and methods for distributed network based secure storage of consumer digital data or content, and more particularly to a system, method, computer program stored on computer readable media and business model for dynamically managed peer-to-peer media content backup that uses a plurality of subscriber personal computer based storage devices to store backups of other subscriber data in a manner that is secure and redundant.

BACKGROUND OF THE INVENTION

As more people begin to use digital cameras, digital video cameras, electronic music players, or other type of electronic devices, information appliances, and the like they are generating larger and larger amounts of digital data and other content. This data and content may usually include content that is associated with irreplaceable memories such as digital photographs and videos, in addition to music that has been purchased through on-line music stores or other providers. The value associated with this content may be sentimental and emotional especially for content that is irreplaceable if lost or would represent a significant financial loss to replace such as for music, video, or other multi-media content in the event it were lost and needed to be replaced.

It may also be appreciated that as these cameras, music players or other devices and information appliances proliferate and are provided with simple intuitive interfaces, they may be used with increasing frequency by users without sophisticated computer skills, and/or by users who may not appreciate the potential for loss of the data or content that may be inherent in either single device or single physical or geographical location storage. Many users, and perhaps the vast majority of users, never transfer any of their digital content to a physical representation (e.g. photo prints), and never back-up their data or content to a truly safe environment, or in any kind of a redundant manner that may guarantee with absolute or high probability, an ability to recover the data or content should a data loss occur. As a higher percentage of this content or other digital asset is only stored in the digital world, loss of this content or these assets due to local computer hard disk failure, computer virus or other malicious code or hacker attack, physical computer or information appliance theft, or fire, water or other natural disaster becomes a truly catastrophic event.

As more and more users find that they or others have lost personal documents either in the form of digital content or even in the form of traditional film or paper photographs, videos, and other personal or family documents, more and more people are looking for solutions to back-up and prevent the loss of their own photos, videos, music and other content.

People are frequently reminded of their own potential vulnerability to loss when they watch broadcast news, browse the Internet, read books or periodicals, or otherwise become aware of home fires, floods, hurricanes, tornadoes, home invasions, or just general thefts and break-ins, the result of which is the loss of digital content or assets as well as of non-digital assets that might have been converted to a digital form through a scanning or other paper or printed media to digital conversion process. Therefore while the problem with conventional storage and backup may be seen to apply primarily to content or other assets that exist in digital form, it may be appreciated that a needed solution extends to content that may be placed into digital form so that it may be stored in a manner that reduces the likelihood of loss.

Conventional existing digital content back-up solutions are less user friendly and frequently require users to have some computer technical knowledge and often to have a strong technical knowledge and ability in order to effectuate even a local backup of the digital content or asset by such means as copying or writing (e.g., burning) the content to an optical media such as to a CD or DVD, copying the content or asset a directly attached local storage such as for example to an external Universal Serial Bus (USB) hard disk drive, or copying the content or asset between multiple personal computers (PCs). These conventional attempted solutions also frequently require that a person purchase and then attach some form of external storage device beyond that which was supplied with the computer (if any), and then when their content is backed-up, that they find some place to safely store their backed-up content, and maintain it in a manner that does not subject it to damage or being overwritten Even when a person has purchased appropriate storage devices, and where required, a software solution to aid with performing the backup, the requirement to setup external storage devices is a significant deterrent to performing the backup for the typical user. Additionally, the physical storage solution that a user chooses is often not adequate to protect against common losses. For example, theft, fire, water damage will often target or affect all the computer and entertainment equipment in the consumer's home, which will likely include the backed-up device and potentially the backup media if separated from the backup device. Viruses may also be present for long periods of time on the user's machine before detection and can infect the backup material and files as well as the original machine. Therefore, even when a person has been diligent about backing up the digital content or asset, it may still be subject to partial or complete loss using conventional practices, systems, and methodologies.

In a partial but largely unsuccessful attempt to solve at least some problems associated with digital content, a limited number of online backup techniques have emerged in an attempt to solve some of the problems associated with the existing in-home or consumer back-up solutions. Some of these solutions attempt to provide storage outside the home to alleviate the concerns of fire or water damage and theft, but they often require the user to actively manage their content backup process. For example, the user may usually still need to interact with the online storage site to actively copy the digital content to be backed-up, again requiring some degree of technical understanding that may lie outside of a non-technical consumer's expertise.

The operating or business model of these backup services and sites are based on the idea that consumers receive a limited amount of storage (typically between about 3-5 GB) space for free storage and then need to pay a monthly (or other periodic) fee as their consumed storage goes up beyond the free allocation. Since digital still cameras and digital video cameras are producing higher resolution content, up to perhaps 8 mega pixels per still image from 3 mega pixels per still image only a few years ago, increasingly the user may quickly exceeds the free storage space allocation, and be subject to monthly excess storage fees.

Relatively new solutions from computer hardware and software providers, manufacturers, and/or vendors (such as for example from Apple Computer, Microsoft, and independent PC manufactures) are looking to solve the problems of requiring users to manage their backup process. The providers, manufacturers, and/or vendors provide solutions that act at least somewhat autonomously by automatically backing-up content on the personal computer (PC) or other information appliance as the user uses their computer. However, these backup process may appear to be automated and may seem to an ordinary consumer to provide all of the data protection that is needed, all of these proposed solutions use the same storage device (such as the single hard disc drive) that is being used for storing the original content. While this provides a solution that enables local retrieval of accidentally erased content, it does not protect against any other type of disaster or loss, including for example, losses that are do to hard disk drive hardware or controller failures, theft, fire or water damage, virus or malicious code attack, or a plethora of other computer problems or failure modes.

There have been some attempts to use information dispersal as an aid to achieve some measure of security or fault tolerance. One example of a conventional information dispersal approach and algorithm is suggested in the paper by Michael O. Rabin, entitled "Efficient Dispersal of Information of Security, Load Balancing, and Fault Tolerance" (Journal of the Association for Computing Machinery, Vol. 36, No. 2, April 1989, pp. 335-348.), which is incorporated by reference herein and hereinafter referred to as Rabin or the Rabin paper or reference. However, this approach alone does not take into account the needs of a consumer directed backup system where some nodes may be determined to be unreliable and the benefits and needs for dynamic redispersal of information over time. It also does not take into account different redundancy requirements that may exist in a consumer oriented managed peer to peer backup service.

Another attempt to implement a file sharing system using a peer-to-peer (P2P) approach is described in a paper by Andrew Tytula as part of the requirements for a Carleton University 95.495 Honors Project and under the supervision of Professor Tony White is entitled "Peer-to-Peer File Sharing System using an Information Dispersal Algorithm".

A further description of some aspects of distributed backup are described in a set of notes available on the web entitled "Distributed Backup through Information Dispersal" by Giampaolo Bella (giamp@dmi.unict.it), Costantino Pistagna (pistagna@dmi.unict.it), and Salvatore Riccobene (sriccobene@dmi.unict.it) all associated with the Università Degli Studi di Catania.

Unfortunately, none of these attempted distributed storage solutions provide the features and capabilities needed for a consumer storage device based free to the user on-line backup storage with retrieval and recovery features.

There remains therefore a need for a system, system architecture, and method that overcomes these problems and limitations of conventional systems and methods.

SUMMARY

In one aspect, an embodiment of the invention provides a server computer for operating a distributed data storage system having data security, redundancy, and retrieval features, the server including: a processor and a memory coupled to the processor; a network communications interface for coupling the server computer to a network; a database for storing data pertaining to the distributed storage in the distributed data storage system and coupled to or coupleable with the processor; a network node reliability monitor for monitoring the reliability of the plurality of nodes on which the data is stored and for generating storage node reliability information; and an information dispersal and control unit for initially dispersing data for backup storage to a plurality of network storage nodes and for dynamically redispersing the data over time according to the storage node reliability information.

In another aspect, an embodiment of the invention provides a system for operating a distributed data storage system having data security, redundancy, and retrieval features, the system comprising: a server computer including: a processor and a memory coupled to the processor; a network communications interface for coupling the server computer to a network; a database for storing data pertaining to the distributed storage in the distributed data storage system and coupled to or coupleable with the processor; a network node reliability monitor for monitoring the reliability of the plurality of nodes on which the data is stored and for generating storage node reliability information; and an information dispersal and control unit for initially dispersing data for backup storage to a plurality of network storage nodes and for dynamically redispersing the data over time according to the storage node reliability information; and a plurality of user nodes at least a first one of the nodes including a first user interface adapted for a first user to identify a data set for backup storage and at least a second and third different ones of the nodes adapted for storage of a portion of the first user data to be backed up.

In another aspect, an embodiment of the invention provides a method for maintaining reliable distributed storage on a network comprising a plurality of data storage nodes, the method comprising: dispersing the data to data storage nodes according to the current dispersement strategy; monitoring and verifying the continued reliability of each peer storage node on which a user data is stored; determining if a storage node has become unavailable or unreliable; and redispersing the data to different storage nodes if it is determined that a storage node has become unreliable, and maintaining the current data dispersement if the storage nodes on which the data is stored are not determined to be unreliable.

In still another aspect, an embodiment of the invention provides a business method for generating monetary revenues from a distributed data storage system service having data security, redundancy, and retrieval features, the method comprising: providing a managed consumer backup service to a consumer without a user fee in exchange for the user providing storage for at least one other different user data; presenting advertisements to a user when the user interacts with the storage system service; and collecting revenues from the entities placing the advertisements.

In one aspect, an embodiment of the invention provides a computer program stored on a computer readable media storing one or more procedures or methods of the invention.

DETAILED DESCRIPTION OF EXEMPLARY EMBODIMENTS OF THE INVENTION

Various aspects, features, and embodiments of the invention are now described relative to the figures.

Contemporary computers sold today usually include at least an 80 GB hard disk drive even for low-end notebook computers, and frequently 300 GB or more for mid-range desktop computers. Many users will not consume all of the hard disk drive space on their computer in normal use, especially for the higher capacity hard disk drives. Furthermore, additional internal hard disc drives, external hard disc drives, and various forms of network attached storage are increasingly available.

Therefore, although users may be generating more digital content than the couple of gigabytes of content that might routinely be provided by the free conventional online storage and backup providers, they may typically still have a lot of available computer or other information appliance based storage space in their home. This is evidenced by the fact that Apple, Microsoft, and others are beginning to leverage the available storage space on the user's own hard disk drive to perform on-machine backup of the user's data. These leveraged storage techniques by manufacturers and vendors may or may not show the user the automated on-machine back-up so that the user may not actually be aware of how the back-up is occurring or the amount of space available for the user's own use.

Figure 1:
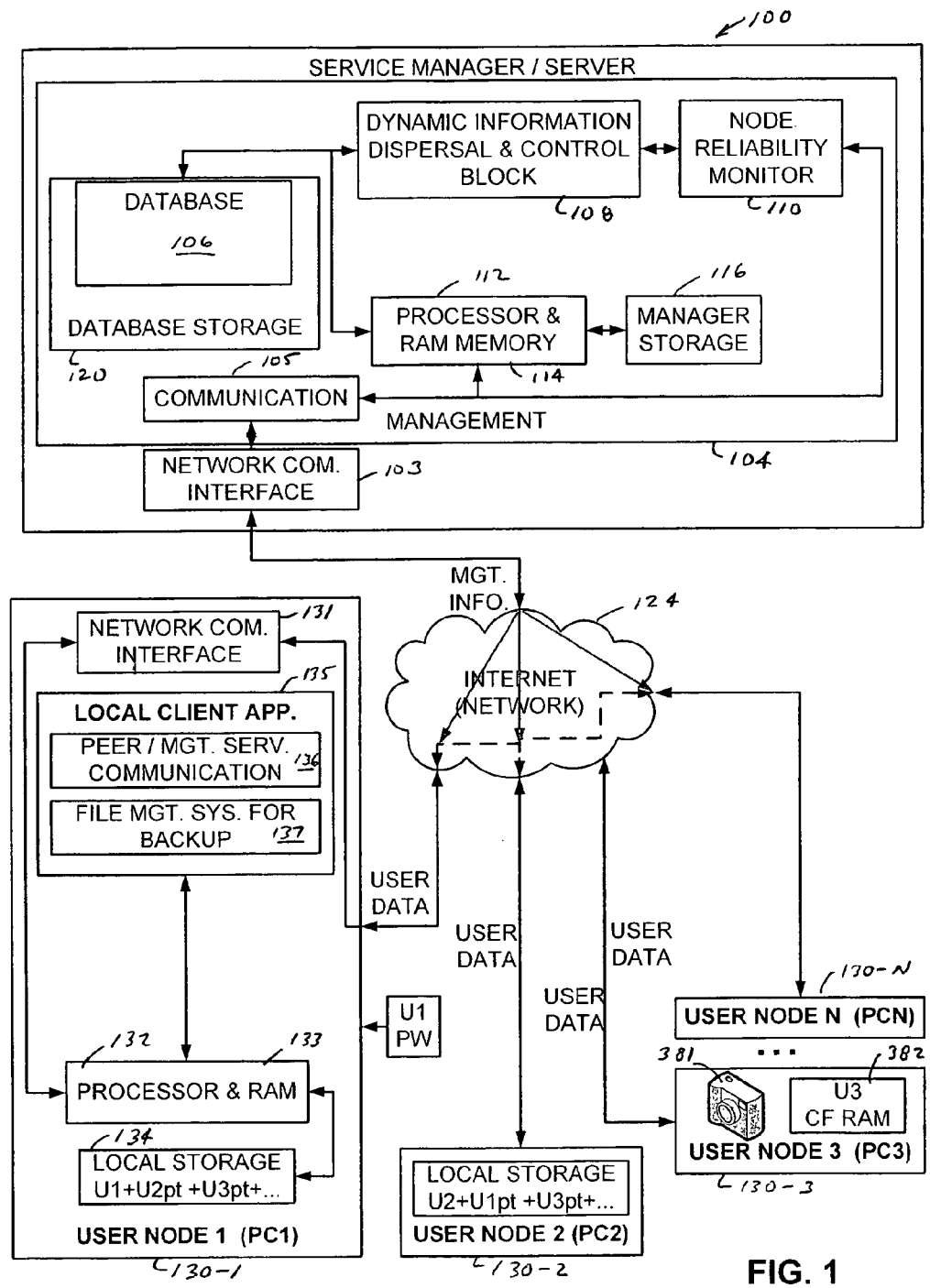
FIG. 1 is a diagrammatic illustration showing a first embodiment of a system configuration and architecture.

In one non-limiting embodiment of the system described here relative to FIG. 1, the system 100 includes Server 102 based management block or manager 104 which may include a database 106, a dynamic information dispersal and control block 108, a node reliability monitor block 110, a processor 112 and processor associated random access memory 114, and optionally a separate management storage such as a local hard disc drive or other storage device 116. It may be appreciated that in one non-limiting embodiment of the invention, the database 106 may be stored on either the manager storage device 116 or on one or more storage device 120. For example, the database 106 may be redundantly stored in the server in a RAID array to provide redundant and recoverable storage of the database. It may also be appreciated that the Server 102 in this embodiment as well as in other embodiments of the invention, individual functional blocks may actually be split into an n-tiered web architecture across multiple individual servers to achieve fault tolerance and/or load balancing without deviating from the current invention. The management block 104 may also include a network communications interface 103 and communications block 105 to enable coupling of the server 102 to the network 124, which may be the Internet, a corporate or other intranet, or any other network of computers, information appliances, storage devices, media generating devices, or the other devices or subsystems that may store or generate data or information, including but not limited to files, sets of files, documents, or other multi-media, pictures, video, or other content.

Database 106 may be defined in non-volatile memory of storage device or subsystem 120 and stores user information, encryption keys when data is stored in an encrypted manner, information identifying peer storage nodes, historical monitoring information indicating availability and reliability of peer nodes 130-N (and optionally other nodes that may be present on the network but that do not presently store data and are not associated with registered users (or their surrogates)), file backup information identifying details of where particular user data or portions thereof are stored amongst the peer nodes, and optional information pertaining to one or more of folder hierarchy and metadata for files of a given user, any relevant data objects for a file that are often used for presentation of the file, user share information if sharing is implemented, and/or user tag related information. Alternative embodiments of the database 106 including an embodiment of a database 206 are described relative to the embodiments of FIG. 2 through FIG. 5 and in Table 1.

Database 106, 206 may support various queries. By way of example, but not limitation, examples of high-level queries may include: browsing the devices (nodes) a user owns, browsing the roots of a given node, browsing the contents of a folder, finding all files that match a tag or other identifier, displaying all or some subset of the tags for a file, displaying all or some subset of the shares a user has permission to, and display the other users invited to view a particular users shares. These are merely examples of the queries that may be made to the database. It may be appreciated that many types of database structures are known in the art that provide a variety of data mining and query operations. These database features may readily be used with a database storing the items described herein elsewhere in this specification and are not described in further detail here.

In at least one embodiment, the dynamic information dispersal and control block (DIDCB) 108 is provided within the manager and is responsible for performing the information or data dispersal computation initially and on a continuing basis for each user data dispersively stored on the peer nodes. The DIDCB receives information either directly from the node reliability monitor or from the database which may store historical reliability and availability information for current peer nodes (as well as potential usable nodes) anywhere in the world. As describe elsewhere herein, the DIDCB dynamically controls the particular node storing each users data and the number of nodes that are used for the storage. In one embodiment, the node reliability monitor sends signals or pings to the nodes, and waits for a response, to determine if particular network nodes are currently on-line and available for access (such as for read and write access). In some non-limiting embodiments of the invention, the node reliability monitor may interact with a node by reading data from, writing data to, or both writing and reading data, so as to determine not only that the node is active and on-line but also that the storage device is responsive and to measure the effective bandwidth of the node.

The management server may be configured so that it is capable of brokering the insertion (or upload) of data from any computer, information appliance, hand-held device, PDA, or terminal no matter how smart or dumb or how thick or thin that terminal or device may be. In at least one embodiment, an account and password may be established from that device or terminal and if it is too thin or dumb of a device, the actual processing may be performed by or brokered by the server, and later the backed up data may be retrieved back to a home computer, business computer, or third party device that has sufficient capabilities to receive and store the data.

In one embodiment, none of the actual user original data is stored in or passes through the management server. When a user client device has sufficient processing capability to perform the mathematics of the information dispersal algorithm and any optional compression and encryption that may be desired or required (and on the restore side sufficient processing capability to perform the decryption and decompression) it is advantageous to leverage the processing capabilities of that user client computer, information appliance, or other device; as well as the bandwidth capabilities of the peer nodes. Sufficient processing capability may for example include processor type and speed and sufficient processor coupled random access memory. There are no absolute requirements as frequently the compression and encryption (and decryption and decompression) may be perform more quickly on a higher performance computer and less quickly on a lower performance computer. As it is the user's own computer, they will usually be accommodating to slower processing since they will be aware that it is their computer that is the limitation and not the free service. Performing the encryption/decryption and compression/decompression on the client device also has the advantage that the smaller compressed size will save network bandwidth and the encryption of at least full size files or content will provide security. For content that is more often pictorial in nature (e.g. digital photography), thumbnails versions of the content may also be generated on the user or source node and uploaded to the management server for use in later user presentation. All the communication between the management server and the end nodes is advantageously performed via HTTP over SSL (or using other security means) to ensure content protection between the management service and the client nodes. Such thumbnails may alternatively be generated on the server by uploading the full images to the server first, but this is disadvantageous at least because of the server processing power and bandwidth consumed.

The management server controls which set of nodes to store a users content on, and to store the vectors and the keys for the user so that the user himself can repair or reconstruct his data in the event or failure or other need. It may be appreciated that access is protected by the primary key which is the user's password. Advantageously, as in all password access controlled systems, the user will store the password only in their brain, not on their computer, and change it frequently. Biometric or other user authentication may also or alternatively be used as well as temporal or second stage authentication systems.

The management server only stores the MD5 or SHA1 hash of the user's password (or other security or access identifier), so that in the event that the management server is compromised, the actual password cannot be obtained by others or compromised.

The management server may be configured so that it is capable of brokering the insertion (or upload) of data from any computer, information appliance, hand-held device, PDA, or terminal no matter how smart or dumb or how thick or thin that terminal or device may be. The system may create an account and password from that device and perform all of the processing on the server, and retrieve data back to a home computer, business computer, or third party device.

The database includes keys and storage vectors and some form of Hash of the password, such as for example MD5 or SHA1 Hash of password, it may also include features to support the file sharing and web access features, as well as other optional data. In one embodiment, the optional data may include metadata about the backup file set, sharing permissions, and other data to support various features.

In one embodiment the information dispersal computation provides a computational layer below the dynamic monitoring control and dispersion or re-dispersion, may be defined by the Rabin algorithm or by variations on that algorithm as may be known in the art with the added component of dynamic monitoring of the system and dynamic modification of the data or information dispersal on a continuing basis. In one embodiment, each of the storage nodes are queried periodically or according to some other rule or policy to verify they are on-line and optionally to determine or verify other characteristics, such as but not limited to bandwidth, capacity, error states or status, and/or any other information that may be useful in determining a reliability of suitability for continued storage of user data already on that node or for new data that may need to have a node assigned for it. This reliability may be determined and stored in the database as a score. In one embodiment, reliability is determined for each storage node by sending a ping signal to the node with a frequency of between about a few seconds and a few days, in another embodiment the frequency may be between 10 seconds and one day (24 hours), in yet another embodiment, the frequency is between about 30 seconds and one day, and in yet another embodiment the frequency is between about every 30 seconds and about every 6 hours. In still another embodiment, the frequency is between about 1 minute and about 4 hours. It may be appreciated that the frequency should be sufficient to maintain the reliability of the storage and that no particular set schedule may be required and that the schedule may be different for different nodes and/or for different parts of the network where historical reliability has been particularly high or low so that less frequent or more frequent monitoring may be advantageous. In any event, the nodes are monitored and the dispersment dynamically modified during the storage life of the user data.

In another embodiment other known information dispersal algorithms, procedures, or routines may be utilized. Although the information dispersal algorithm identified by Rabin may be applied to the present invention, it should be appreciated either the Rabin information dispersal algorithm or other IDAs as may be known in the art are modified and/or applied in a different manner to the system and method of the present invention. These differences are described elsewhere in this specification, and the overall dynamic information dispersal and control operation is set forth in the flow chart diagram of FIG. 7 described in detail hereinafter.

Rabin describes an information dispersal algorithm (IDA) that breaks a file F of file size or length $L=|F|$ into n pieces $F_i$, where $1 \le i \le n$. Each of the n pieces $F_i$ being of length $|F_i|,=L/m$, so that every m pieces suffice for reconstructing the file F. The Rabin file dispersal and reconstruction algorithm are considered to be computationally efficient. It may be noted that the sum of the lengths $|F_i|$ is $(n/m)-L$, and since n/m can be chosen to be close to 1, the Rabin IDA is also considered to be space efficient. The Rabin IDA may be applied to applications for secure and reliable storage of information in computer networks and even on single disks, to fault-tolerant and efficient transmission of information in networks, and to communications between processors in parallel computers.

Rabin describes a procedure for splitting and later recombining the split files, which procedure is described below. It may be appreciated in light of the description provided here that although the inventive system and method may utilize the Rabin algorithm and procedure as summarize below, the inventive system and method are not limited to this information dispersal algorithm or to the particular procedure or method for splitting and recombining files or blocks of data. Rather the Rabin algorithm and procedure is exemplary of one possible procedure.

Rabin considers a file $F=b_1, b_2, \ldots, b_N$, that is, a string of characters, and assumes that one wants to disperse the file (or as applied to the invention, some file, set of files, block of data, or other information set) F, either for storage or for transmission, under the given condition that with overwhelming probability no more than k pieces will be lost through node storage or communication-path failures.

The characters $b_1$ in the string may be considered as integers taken from a certain range (for example, a range [0 ... B]). For example, if the $b_1$ are eight-bit bytes, then $0 \leq b_1 \leq 255$. The algorithm is not limited to any particular number of bits or bytes. If one takes a prime number B, where B<p, then for bytes, p=257 will suffice. It may be desirable to choose a prime larger than the smallest B<p that will suffice. With p chosen such that p=257 there is an excess of one bit per byte. The Rabin IDA may be implemented in fields $GF(2^{ss})$, where s=8 for bytes, without any excess. In mathematical terms, F is a string of residues modular or mod p, that is, a string of elements in the finite field $Z_p$, and the following computations described further in Rabin are in $Z_p$, that is, mod p.

First, choose an appropriate integer m so that n=m+k satisfies $n/m \leq 1+\epsilon$ for a specified $\epsilon > 0$. Choose n vectors $a_i = (a_{i1}, \ldots, a_{im}) \in Z^m_p$, $1 \leq i \leq n$, such that every subset of m different vectors are linearly independent. Alternatively, it suffices to assume that with high probability, a randomly chosen subset of m vectors in $\{a_1, \ldots, a_n\}$ is linearly independent. The Rabin paper shows how to satisfy each of these conditions.

The file F is segmented into sequences of length m. Thus, file or block of data F is given by the expression:

$$F=(b_1, \ldots, b_m), (b_{m+1}, \ldots, b_{2m}), \ldots$$

Now, denote $S_1$ by the expression $S_1=(b_1, \ldots, b_m)$, etc. Then, for i=1, ..., n, $$F_1=c_{i1}, c_{i2}, \ldots, c_{iN/m},$$

Where, $c_{ik}=a_i \cdot S_k=a_{i1} \cdot b_{(k-1)m+1}+ \ldots +a_{im} \cdot b_{km}$ It follows that the magnitude of $F_1$ is given by $|F_1|=|F|/m$. Therefore, if m pieces of file or data block F, for example m pieces $F_1, \ldots, F_m$ are given, one may reconstruct the file or block of data F as follows. Let $A=(a_{ij})_{1 \leq ij \leq m}$ be the m×m matrix whose ith row is $a_i$. Rabin shows that:

$$A \cdot \begin{pmatrix} b_1 \\ \vdots \\ b_m \end{pmatrix} = \begin{pmatrix} c_{i1} \\ \vdots \\ c_{m1} \end{pmatrix}$$

and hence $$\begin{pmatrix} b_1 \\ \vdots \\ b_m \end{pmatrix} = A^{-1} \cdot \begin{pmatrix} c_{i1} \\ \vdots \\ c_{m1} \end{pmatrix}$$

Next, denote the ith row of $A^{-1}$ by $(a_{i1}, \ldots, a_{im})$, then in general, for $1 \leq k \leq N/m$, the following expression holds:

$$b_j=a_{i1}c_{ik}+ \ldots +a_{im}C_{mk}, 1 \leq j \leq N,$$

where i=j mod m, k=[j/m] (here we take the residues to be 1, ..., m).

Thus one may invert matrix A once and for all, and reconstruct file or data block F by the above expression, which involves 2 m mod p-operations per character of file or block F. Rabin demonstrates that for sufficiently large files satisfying $m^2 \leq |F|$, the operation cost of computing $A^{-1}$ is majorized by the cost of reconstructing F by the above expression for $b_j$, even if one uses $m^3$ operations for computing $A^{-1}$. Rabin shows that one can choose $a_1, \ldots, a_n$ so that the computation of any $A^{-1}$ will require just order of $m^2$ or $O(m^2)$ operations.

Since both splitting up the file by the expression $c_{ik}=a_i \cdot S_k=a_{i1} \cdot b_{(k-1)m+1}+ \ldots +a_{im} \cdot b_{km}$, and reconstruction by $b_j=a_{i1}c_{ik}+ \ldots a_{im}C_{mk}$, involve just inner products, so that the method is readily adaptable to vectorized, systolic, or parallel architectures.

Rabin also observes that it is possible to use other fields instead of $Z_p$. For example, for 8-bit bytes one can directly use the field $E=GF(2^8)$ of characteristic 2 and having 256 elements. All one needs is an irreducible polynomial $p(x) \in Z_2[x]$ of degree 8 to allow us to effectively compute in field E.

Therefore, one may use the vector equations described in Rabin. The individual vectors that are generated are stored in the database 106, 206 and used during retrieval, restoration, and/or redispersing steps. Existing storage vectors may be utilized for retrieval or restoration when still current, or the storage vectors may be recomputed according to the dynamically determined dispersal or redispersal strategy that may be needed at the time.

Again, It may be appreciated in light of the description provided here that the Rabin algorithm and procedure, as well as alternative procedures as may be known in the art, may be used as a component for splitting and recombining of files or blocks of data in the inventive dynamic data or information dispersal and maintenance procedure.

Returning to the description of the exemplary system, processor 112 and processor associated random access memory 114 may be conventional single core or multiple core processors or microprocessors and on chip or off chip random access memory as are know in the computing arts. The processor may also include or be coupled to special purpose logic or co-processors that may implement particular compression, decompression, encryption, and/or decryption in hardware or as a combination of hardware and firmware.

Manager storage may be any storage device such as a hard disc drive or a plurality of physical or logical drives, and may be used by the processor 112 for the nonvolatile storage of computer program code, operating system elements, data, temporary storage or virtual memory, and for other storage as is known in the computer arts. In one embodiment, manager storage is used to store a server application program 111 for controlling the overall operation of the server 102 and for interacting with the local client program, web based programs, or other generic or specialized interfaces presented by the peer nodes and optionally with other network 124 elements.

The management block 104 may optionally include either or both of data compression/decompression block(s) or module(s) 118a, 118b, and data encryption/decryption block(s) or module(s) 119a, 119b. Alternative embodiments of the system manager block that include one or more of data compression/decompression module(s) 118, and a data encryption/decryption module(s) 119 are described with reference to the system configuration and architecture of FIG. 3 hereinafter. It may be appreciated that while both data compression and data encryption are desirable and have many advantages, they are not required as part of the invention. Data decryption and data decompression are only required to retrieve or recover data that has earlier been encrypted and/or compressed, so that these processing components are also optional. It should also be appreciated that any compression, decompression, encryption, and decryption may be performed within the server 102, by processing entities coupled to the server 102, by any one of the nodes 130-1, 130-2, . . . , 130-N, or by another processing entity to which the compression, decompression, encryption, and/or decryption may be outsourced to. At the same time, there are described particular implementation and operational strategies that may favor performing a particular one or a combination of these operations within the data owner's node 130-1, by the server 102, or in somewhat more limited situation by a node different from the server or the data owner's node (e.g., web access described hereinafter relative to FIG. 3)

The system may also include a plurality N of other network nodes 130 (e.g. 130-1, 130-2, 130-3, . . . , 103-N), where the number of nodes may be variable over time as nodes are added to or removed from the network. As will be described in greater detail herein, the nature of each node may vary depending upon its primary responsibility (if any) in the network. At least some plurality of the nodes 130, but not necessarily every one of the N nodes, must support a data storage function so that a data dispersal aspect of the invention may be implemented, wherein a first user's data in backed up and stored onto a storage located at or associated with at least two (or some other plurality) other different nodes. Some of the nodes that do not have appropriate storage, may participate in network activity but not act as storage nodes for other users.

In one embodiment, the network nodes comprise personal computers having a processor and memory coupled to the processor, as well as input/output devices (such as a keyboard, mouse, and display screen), a network interface (such as a NIC card or circuit) and optional peripheral devices. Those nodes acting as, or capable of acting as storage nodes for other user data will also include a mass storage device, such as one or more rotating magnetic or optical media disc drive. Frequently, the storage device will be a hard disc drive with sufficient free space to serve as storage not only for the owner of that devices data, but also for the dispersed storage of one or more other users data as will be described in greater detail herein.

Embodiments of the invention are adapted for storage of digital content of all kinds, including data that was originally in an analog electronic or signal form or for paper documents that have been converted to a digital form. References to data will include any one or combination of digital or computer files, file folders, file folders and the contents thereof, multimedia content, videos, pictures, images, music files, and any other form of digital or computer readable or storable information.

In the non-limiting embodiment of the system in FIG. 1, the exemplary user node 130-1 includes a processor 132 and random access memory (RAM) 133 coupled to the processor, at least one local non-volatile storage device 134 usually in the form of a hard disc drive that is coupled with the processor and RAM memory over a high speed internal bus. Additional storage devices may be present such as external hard disc drives coupled by SCSI, USB, Firewire, eSATA, or any other know or to be designed interface. The user node 130-1 also includes means for connecting to or coupling with the network 124. The means for connecting may be or include a wired or a wireless connection, and utilize any know network interface card (NIC), 802.11-based wireless connectivity, broadband or satellite connection, or the like. Conventional components of personal computers are not shown or described to avoid obscuring inventive aspects of the computing device, system, and method.

In at least one embodiment of the invention, the user node 130-1 includes a specialized local client application program 135, although embodiments will be described that do not include such specialize local client will be subsequently described. In one non-limiting embodiment, the local client application is in the form of an applet, Java plug-in, program code the includes an active-X component, or other program structures that provide or will provide analogous operational features in the future.

In one embodiment, the local client application program 135 includes a peer node 130-2, . . . , 130-N and management server 102 communications module 136 and a local file management system for backups 137. These two modules either alone or in combination execute in the user node computer processor and memory to facilitate operation of the node 130-1 relative to the server 102 and the other peer nodes 130-2, . . . , 130-N. As described herein elsewhere, the local client application (or more simply, "client") may be downloaded from server 102 (or from any other source) during user registration with the backup service. After downloading, the client participates in the interaction between the user and the user's computer and the server. The client 135, and particularly the communications module 136, may also participate in communications between the user peer node 130-1, and other of the peer nodes 130-2, . . . , 130-N, such as for example when sending backup data segments after processing to other of the peer nodes through client network communications interface 131.

The file management module 137 may operate within the local user computer to assist in identifying files that may need to be backed up, and may include features such as file or folder searches and other administrative tasks that will facilitate informing the user of a current backup status, to identify backed up files, to identify new files that have not been backed up, at the like operations. The file management module may interact with existing elements of the operating system, utility programs, application programs or the like to efficiently identify new files that are brought into the file system of the computer either by local generation, downloading from an external source, or in any other way.

The local client 135 may optionally include either or both of a data compression/decompression module 138, and a data encryption/decryption module 139. Alternative embodiments of the system that include one or more of data compression/decompression module 138, and a data encryption/decryption module 139 are described with reference to FIG. 3 hereinafter.

With further reference to the embodiment of FIG. 1, there are shown several exemplary user or peer nodes 130-1, 130-2, 130-3, and 130-N. Characteristics of a typical exemplary peer node 130-1 have been described and it is anticipated that many or most peer nodes may be personal computers or PCs. On the other hand the invention is not limited to personal computers as peed nodes. For example, peer nodes may include thin client devices that have relatively low level processors, little memory, and perhaps no real mass storage device to storing other different user data. One example of such a peer node device is a digital still or video camera 381 that has some internal memory for operation of the camera, possibly an on-board or externally available network connectivity (such as a Wi-Fi, 802.11x, Bluetooth, or other connectivity) and a memory card 382 for storing the still or video images. In one application of embodiments of the invention, a user while traveling away from their home or business computer, may want to be able to upload and store new images either as a backup of internal memory of the camera as a kind of insurance, or because the user is not carrying sufficient storage capacity with him/her (such as in the form of multiple memory cards, compact flash (CF) RAM cards, CD or DVD recording device, hard disc drive storage, or a personal computer on which copies of the memory cards from the camera can be transferred). The user may therefore create a backup from the camera to the service just as he/she would from any other peer node, with the proviso that in this instance, due to the limited processing power of the camera, the server may more likely be tasked to process the image files. This server based processing may include the compression, encryption, and dispersion of the user data. In this operational scenario, the user would upon returning home (or to any other location) to their computer, may upon providing appropriate authentication, retrieve and restore all of the image files that were earlier uploaded to the system and service.

Even though the backup was generated in multiple upload sessions, the user may retrieve and recreate the desired file system on their computer. A tool or wizard may optionally be made available on the client to assist in creating a file, folder, or other directory structure for the files. In one embodiment, the camera or other device may be manufactured to include a special purpose processor or logic to perform a hardware and/or hardware-firmware version of compression, encryption, and/or data dispersal so that the camera or other thin client device may perform more of the processing so as to alleviate at least some of and perhaps all of the processing that the server 102 might otherwise need to perform. It might be expected that this capability and service may also be useful to news organizations, photojournalists, and travelers, as well as to typical consumers. When providing this service to commercial organizations, a fee-based business model may be employed wherein commercial users are charged for data volume, storage capacity used, bandwidth, CPU cycles, or any other metric that would represent the cost of providing the service plus profit. This fee-based model may be more appropriate as the revenues from advertising may not permit recoupment of costs and the volume of storage may be relatively large.

Another possible peer node device may be a storage device with network connectivity. Such a peer node may not itself have a typical personal computer interface but would represent some network attached storage. One type of device that incorporates Network Attached Storage (NAS) capability and may be directly attached to network without an intervening computer including but not limited to products like Shared Storage II™ made by Maxtor, Inc. of Milpitas, Calif., USA (See website at www.maxtor.com). Other primarily storage device type peer nodes may be used.

It may be appreciated that peer-to-peer connectivity or networking technologies have been leveraged over the past several years as a method of distributing content from a single content provider to multiple consumers of the provided content. This peer-to-peer connectivity or networking content delivery model and method have been used in very successful, although often questionably legal, deployments. The peer-to-peer connectivity or networking content delivery technologies behind these solutions enable consumer devices coupled or coupleable on the Internet (or over any other network) to communicate with each other without a host or hosted service brokering the communication or the bandwidth. For the content distribution world, this non-hosted peer-to-peer connectivity can save significant bandwidth costs for the content service provider.

While a non-hosted peer-to-peer communication and content delivery in either direction (upload to or download from) may be preferred, embodiments of the invention described herein are not limited to non-hosted or to peer-to-peer configurations or operation.

Known conventional systems and methods differ from the present invention in at least two fundamental ways. Conventional systems and methods operate in a manner where there is no centrally managed service that knows about or manages the storage or peer nodes in the network. In file swapping networks of questionable legality, the lack of a manager is ideal as it makes it difficult for any authority to monitor the network or impose any liability. In backup systems and methods it created problems. In such file backup systems and methods, peer groups of users may at least somewhat effectively store and obfuscate the data to provide some measure of security using Information Dispersal Algorithms (IDA) or procedures. Some conventional IDA algorithms and procedures and backup schemes have been described in the background. In these conventional implementations, the vectors used to store and retrieve the backed up data are stored only on the originating host, such as the user computer. As such, if the originating host is destroyed or lost, the backed up data cannot be reconstituted anyway, resulting in an inability to retrieve or restore the backed up data. Therefore, an unmanaged conventional peer-to-peer backup system and method may not achieve the performance and capabilities desired.

By way of comparison, the system and method of the present invention, stores vectors in the managed service in a management service storage or database which allows for a retrieval or restoration to work successfully even without a user needing to store the vectors anywhere else than in the management service storage.

The inventive system and method also provide management service over the peer group that may have an increased reliability and redundancy factor. Embodiments of the invention provide means by which the reliability and/or redundancy may be dynamically tuned or optimized. As described in greater detail elsewhere in this specification, one possible component for increasing reliability and redundancy is to monitor and maintain a history of the peer nodes in the network that reflects on their on-line or on-network availability or uptime as well as measures of their reliability. The manager may then recommend and control which selected peers of the available peers to store data to both when new data enters the network, and for data that is already on the network but perhaps not in the most reliable or available peer node storage assets. This allows for historical uptime and reliability to indicate future reliability for this storage node in the network.

The management service may also use the availability or uptime history as well as the reliability information in order to change or shuffle the peer node storage locations or devices to other peer node storage locations or devices in the network if and when the reliability of an original storage node is no longer valid. This shuffling may be accomplished before a peer node storage device becomes unavailable or after the peer node storage becomes unavailable, as only a subset of the peer node storage devices are required to recreate, retrieve, or recover the backed up data. The inventive system and method leverage the same IDA procedure that was used to build the file from portions of the storage nodes to constantly rebuild and recreate storage nodes when some of the nodes disappear. This allows for the whole data set to be completely managed and moved around even after the data was originally stored on or inserted into the network.

Figure 2:
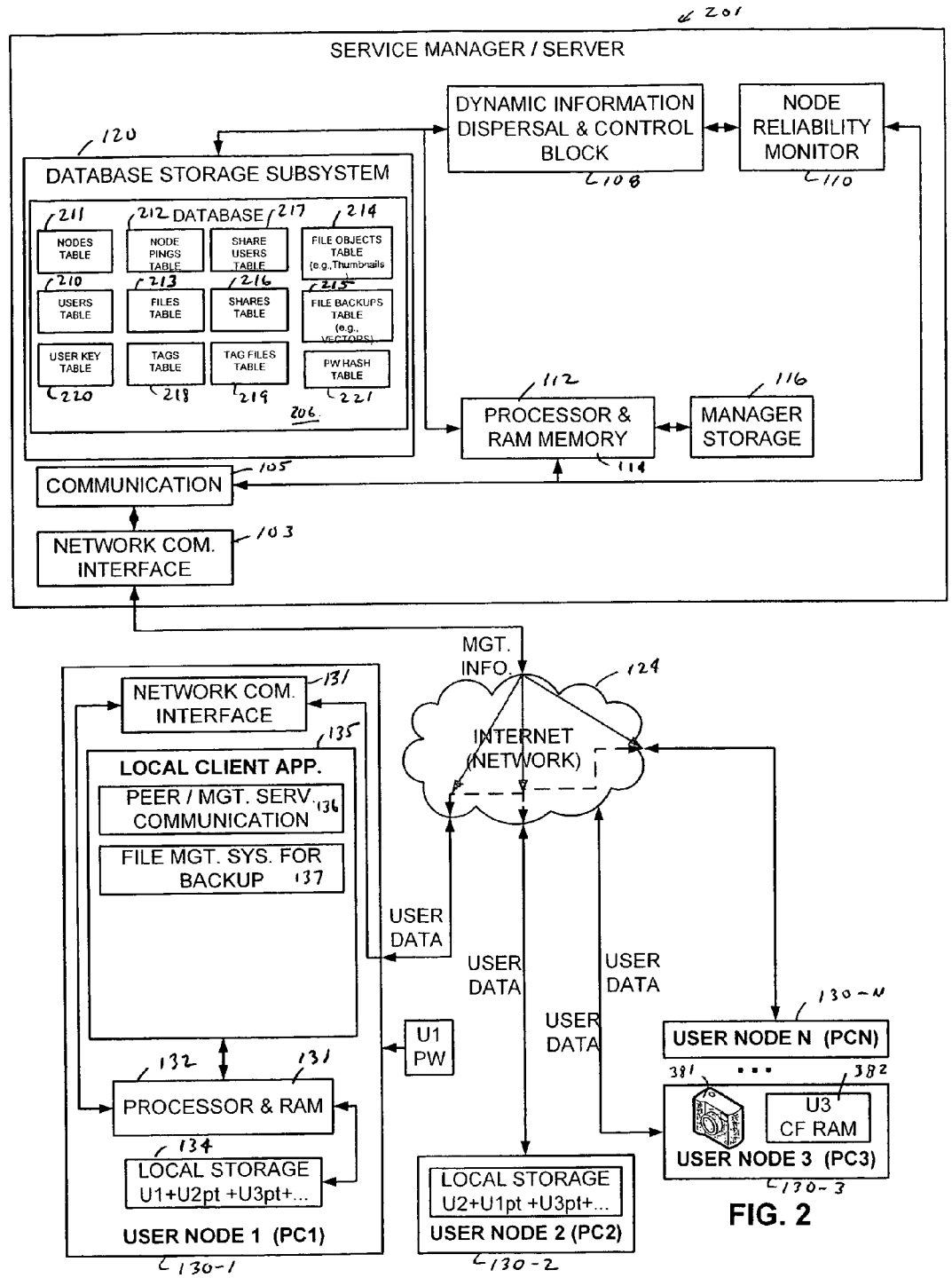
FIG. 2 is a diagrammatic illustration showing a second embodiment of a system configuration and architecture including aspects of an exemplary database.

With reference to FIG. 2, there is illustrated an exemplary system 201 according to a non-limiting embodiment of the invention. This embodiment is similar to the embodiment of FIG. 1 and adds additional details relative to an exemplary management database 106. Table 1 provides a summary of elements in an exemplary embodiment of the database 206 which is a particular embodiment of database 106. It will be apparent to those skilled in the art in light of the description provided here that the same or analogous operation may be achieved by a database having a different organization, different fields or records, or the like so long as any required information is available for management and control of the server and its components, of the peer nodes, of the communications, and of the backed up data itself.

References to tables may mean actual tables, lists, data structures, or other database element that is capable of storing records, parameters, numbers, vectors, scalars, of other values in the manner of a table or plurality of tables.

This particular embodiment of the database 206 may include a Users Table 210 that is one of the primary user tables and contains an entry for each user in the system and service. In one embodiment, the table may store a single row per each unique user in the system. Nodes Table 211 that may be used to manage the storage nodes known, where the storage nodes may be local or anywhere in the world, and where storage nodes may be owned by users or may be provided by non-user entities. A Node Pings Table 212 may store historical ping information from storage nodes in the world which may have been obtained by the node reliability monitor. A Files Table 213 may store a folder hierarchy and optionally metadata for files of a given user. An optional File Objects Table 214 may store any relevant data objects for a file that are often used for presentation of the file; examples of this include thumbnails for image or video files or other documents or "snippets" of textual files. A File Backups Table 215 may store the backup vector details for each file that was backed up. An optional Shares Table 216 may store a user's defined shares when sharing is optionally provided. An optional Share Users Table 217 may store the mapping from shares to users allowed to view it when this feature is optionally implemented. An optional Tags Table 218 may store the user's defined tags, and an optional Tag Files Table 219 may store the user's mapping between tags and files. A password hash table for storing a hash of a user password may be provided as a separate table or included within one of the afore described tables. It will also be appreciated that the database may be differently constructed so long as it includes any required information or data and that more or fewer tables may be utilized to accomplish this. Therefore it will be appreciated that although the exemplary database as described has advantageous features, the invention is not limited by any particular database structure or organization.

User Keys Table 220 may store the encryption keys used to validate the users and nodes. Different numbers of keys may be utilized depending on the actual implementation. For example, consider a situation where there are a number "u" of users. Each user may have zero (0) or more installed clients referred to as nodes. The total set of nodes is a number "n". Each user may have one or more keys "k". Each of the nodes may store one or more backup sets, where each backup set may contain or include a tree of files and directories, or some other data structure. For each file, metadata for the file may be stored in the management service, such as for example in a management service server resident or coupled database. For each file, a number "m" of the other n−1 nodes are chosen to disperse the data to. For each of the m dispersals, one record exists in the storage information table in the management service. It may be appreciated that when dynamic management is advantageously implemented, the value of m can be tuned and optimized and the nodes of n in the m storage information tables can change as the management service chooses to facilitate improved availability, reliability, and appropriate redundancy.

With reference to File Backups Table 215, which describes storage vectors as used in conjunction with the information dispersal algorithm and procedure, it may be appreciated that while embodiments of the invention may provide for the storage of the individual storage vectors required to rebuild the user data to be stored at different locations, even possibly including at one or more user location, advantageously and preferably the individual storage vectors or other means for identifying information for reconstructing or rebuilding a particular user backup content are stored only on the inventive service. This allows for the added security of not storing the individual storage vectors on the peer nodes as well as not losing the storage vectors if and when the original user content source device fails (which is the whole reason for backing up in the first place). Where storage of the individual storage vectors or other content rebuilding or recreation information is provided by a storage device on the management service, such as on a content service provider management server, the storage may be made in such a manner that such storage is redundant to any needed degree. The redundant storage of the storage vectors, may for example, be provided by mirroring, any applicable RAID type redundancy, the maintenance of multiple separate storage devices at different physical locations, or as otherwise known in the art. Storage vectors are further described relative to the information dispersal algorithm and procedure as well as an exemplary database and database tables.

TABLE 1

Summary of Database Tables In An Embodiment Of The Invention (Including Optional Tables Not Required In All Embodiments)

| Table Name | Table Function or Storage |
|---|---|
| Users Table | Primary user table contains a single row per each unique user in the system. |
| User Keys Table | Store the encryption keys used to validate the users and nodes |
| Nodes Table | Manages the storage nodes. Storage nodes may be local or anywhere in the world. Storage nodes may be owned by users or may be provided by non-user entities. |
| Node Pings Table | Historical monitored ping information from storage nodes in the world. |
| Files Table | Stores the folder hierarchy and metadata for files of a given user. |
| File Objects Table | Stores any relevant data objects for a file that are often used for presentation of the file. Examples of this include thumbnails for image or video files or "snippets" of textual files. |
| File Backups Table | Stores the backup vector details for each file that was backed up. |
| Shares Table | Stores the user's defined shares. |
| Share Users Table | Stores the mapping from shares to users allowed to view it. |
| Tags Table | Stores the user's defined tags. |
| Tag Files Table | Stores the user's mapping between tags and files. |

While a user may usually have at least one user node, a user may have zero nodes or a user may have a plurality of nodes where the plurality of nodes may be N nodes where N is an integer value. The number of keys may be different from the number of nodes, and that may be different from the number of users in general. In one embodiment, there is a single key per user, but there is no requirement for a single key per user. In one embodiment, there must be at least one key per user who is submitting or uploading encrypted data to the network.

There is no requirement for a key or for a separate key for a user who may be retrieving data from the network, such as an invited guest who is invited to share data or content of a registered user. The invited user or member of a share group would use the key of the registered user who formed the share group and a password that is chosen by them or auto-generated by the system if they are a newly invited user. In another embodiment, the share groups have different keys. In another embodiment, each file has it's own key and the different members of the share group have different keys used to decrypt an encrypted copy of the file key.

Storage vectors comprise server data base entries that tell the system where the dispersed pieces or segments of a user's files, folders, data, and/or content are stored and which IDA vectors were used for that segment. Embodiments of the system and service provide for dynamic redispersement of a users data so that the storage vectors may usually change over time. For example if segments of the registered users data are stored on five different storage nodes, there will be five vectors associated with that user's data in the database. If the user data is redispersed to six storage nodes, then both the number of nodes and the identity of the nodes will change. Alternative strategies may be utilized to identify storage locations so that there may be more or fewer vectors than the number of storage nodes. Alternatively, other database or identification means may be used to identify the storage nodes. In one embodiment, a single database vector may be used to identify all of the storage nodes associated with a particular user's data. In terms of the number of nodes involved in storing a users data, there can be a tradeoff on storage space for flexibility and scalability. Advantageously, a plurality of storage nodes identified by a plurality of storage vectors include at least some storage nodes at geographically different or diverse locations.

In one embodiment, each storage node entity that gets put into the system whether at the file level, a set of files level, a block level, or at an overall system or block level needs a storage vector per each of the devices where that data will be stored in. Therefore by way of example, if a file is going to be broken up into 16 pieces or segments for storage in 16 different storage entities, one would need 16 vectors for that file. These same vectors may be used to both break up the storage entity prior to dispersal and for recombination as a reverse dispersal during retrieval or restoration.

Technically this can be applied at the entire user level so that each user has for example only 16 vectors. It may also be applied at the node level so that each nodes that the user has includes 16 vectors. In another embodiment, it may be applied at the file level so that each of the user's files has 16 vectors. Storage may be managed to convert the storage between and among different levels, such as from a user level, block level, file level or the like to a different storage level. This may be accomplished by performing a partial or total reverse IDA to recover at least the data that is desired to be dispersed at a different level, and then performing the redispersal using the forward IDA.

Dispersal at the node level provides that each user has one or more nodes from which they are going to submit data to the network. Dispersal at the file level provides that each file is to be separately broken up or segmented by the IDA and recovered by a corresponding reverse IDA. Dispersal may also or alternatively be accomplished at a different level wherein a block or data or a set of files is processed by the IDA. Embodiments of the invention may provide for any arbitrary set of collection of data to be dispersed together by the IDA and then reverse IDA to retrieve or recover that data.

In one embodiment, each vector is or permits the identification of a single storage node and a single portion of the user data. The collection or set of vectors (for example the 16 vectors in the above example) specifies all of the locations where a user data is stored and it is some tunable subset (including the full set) of these vectors that permits complete retrieval and restoration of the totality of the users backed up data. Less than this subset will garner none of the user's data and thus this defined subset of backed up nodes must all be compromised in order to retrieve any of the user's data. In the option of the additional encryption step before dispersal, the key used for encryption must also be compromised from the management service before the original data can be retrieved.

In one embodiment, a complete storage reference of a file or data set has a plurality of mathematical vectors that are adapted for transforming the data to be dispersed and stored in accordance with the information dispersal algorithm. A vector is a sequence or set of numbers and is what one performs the mathematical operations on the data that is going to be stored on the storage nodes. Recovery of the original back up is achieved by a process that is somewhat the inverse or reverse of the process used to store and disperse the original data, which the exception that only Z of the M nodes need to be accessed where Z<M. The inverse of using Z of the vectors, which is some subset less than the total number of nodes M on which storage occurred (e.g., Z<M), is taking the Z vectors out of a the total set M vectors for the p storage set, and doing an inverse matrix transformation and applying that back from the data obtained back from the Z nodes. This permits complete rebuilding of the data set.

Storage vector references are entries in the data base that indicate for a given users file or block of data (depending on the file, node, user, network, or other level) where that file is broken up and stored amongst the storage nodes of the network. The database and the entries of storage references in the database are managed by the management server, and may usually change over time as the storage peer node reliability may change over time and user data is moved from less reliable nodes to more reliable nodes.

Figure 3:
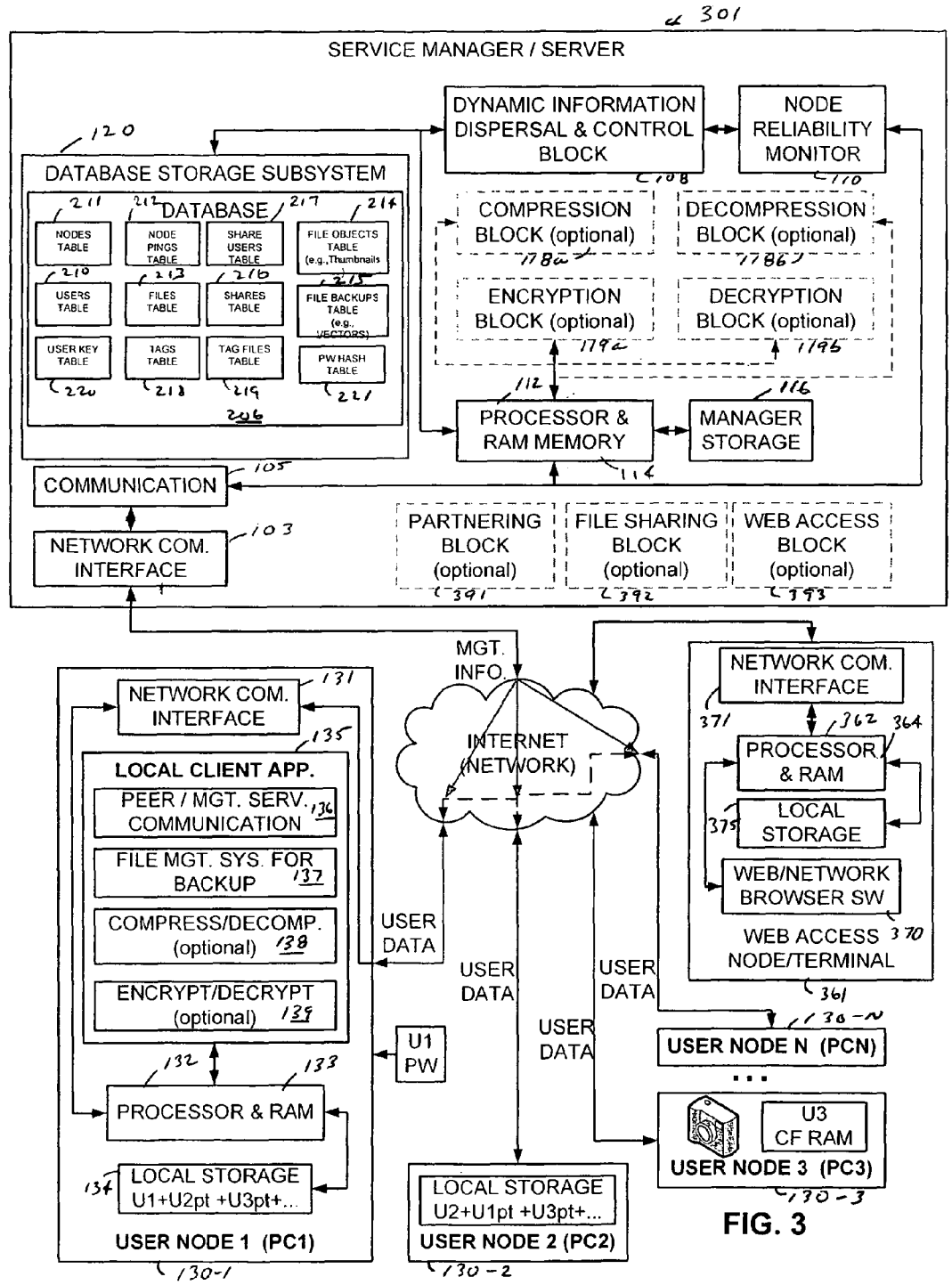
FIG. 3 is a diagrammatic illustration showing a third embodiment of a system configuration and architecture including aspects of an exemplary database and optional compression/decompression, encryption/decryption and web access node features.
Figure 4:
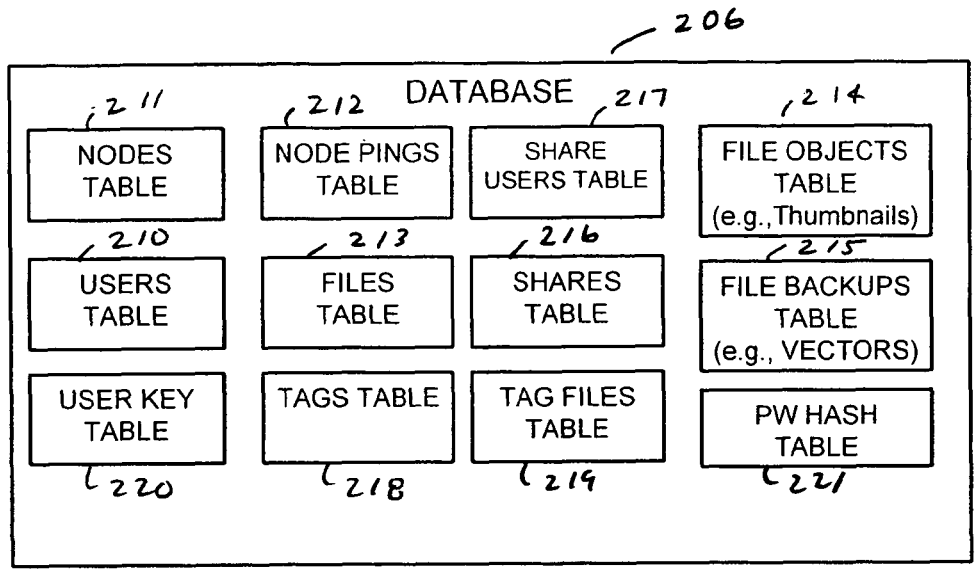
FIG. 4 is a diagrammatic illustration showing an embodiment of a database.
Figure 5:
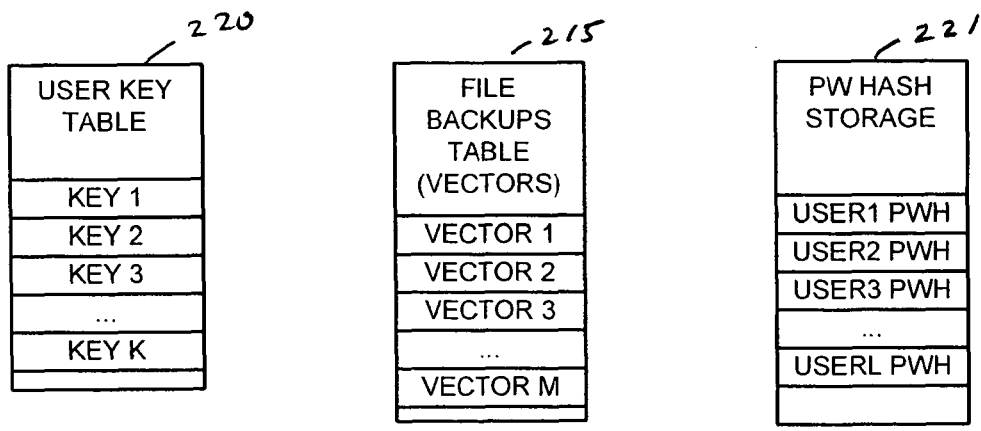
FIG. 5 is a diagrammatic illustration showing an embodiment of a database user key table, a file backups or storage vector table, and a password Hash storage table.

Having now described a particular embodiment of a management database that may be used with the invention relative to the embodiment in FIG. 2, attention is now directed to a similar embodiment of FIG. 3 that adds certain optional compression and decompression, optional encryption and decryption. FIG. 4 is a diagrammatic illustration that separately shows an embodiment of the inventive database 106. FIG. 5 shows additional detail for the user key table, the file backups or storage vector table, and the password Hash storage table illustrating the multiple entries typical of these tables.

With further reference to the embodiment in FIG. 3, the optional compression and decompression, and/or optional encryption and decryption may be provided either in the server 102 or in the peer node (such as in peer node 130-1). In the event that the optional compression and decompression and/or optional encryption and decryption is present only on the server 102, then where these processing features are desired they may be performed by the server. Where the optional compression and decompression, and/or optional encryption and decryption are present on the peer node client 130-1, they are advantageously performed there to unburden the server processor and to leverage the processing capabilities of the peer nodes. The optional compression and decompression, and/or optional encryption and decryption may alternatively be outsourced to another processor by the server or by the peer node client. The system in FIG. 3 therefore identifies an optional server resident data compression functional block 351, an optional server resident data decompression functional block 352, an optional server resident data encryption functional block 353, and an optional server resident data decryption functional block 354. The system of FIG. 3 also identifies an optional peer node client resident data compression functional block 361, an optional peer node client resident data decompression functional block 362, an optional peer node client resident data encryption functional block 363, and an optional peer node client resident data decryption functional block 364. It may be understood that these compression, decompression, encryption, and decryption may be performed by the server or by the peer node or nodes in any combination.

Rationale for including the optional compression, decompression, encryption, and decryption are now described. Also described are some rationale for performing these optional operations at a particular location in the system.

Optionally, but advantageously, embodiments of the invention may increase storage efficiency and capacity, of the peer network, by passing user data or content through a compression algorithm before breaking it into pieces. This compression may be performed either on the user node peer side for whom the backup is being performed (upload or insertion side), at the receiver storage node side (download), by the management server, or at some intermediary anywhere between the source peer node and the destination peer node or nodes, such as for example by an optional server. Depending on the actual files, folders or set of files, or other content the particular user chooses to backup in the storage network, this compression may usually assist in minimizing the overhead of the reliability choices made by the inventive Management service, since the overhead for the choice of the information dispersal algorithm nodes is inversely proportional to extra space used.

It may also be appreciated that if the compression is performed at the content source node, then the bandwidth required over the peer-to-peer or peer-to-server-to-peer connection will be reduced. The determination as to where the compression is best accomplished may be based on a user selection, an automatic selection by client software or algorithms or procedures in the source node device, by the manager, or by other means in the system. Compression is also optional, but particularly when the compression is lossless, the advantages of compression including a reduction of storage space volume on the storage nodes, and the reduction in bandwidth for communicating the data over the network connections, are clearly present and should advantageously be implemented in a practical system.

In a further optional but advantageous enhancement to the inventive system and method, and to advantageously increase the security of the original user data, an additional data encryption maybe performed on the user data. Preferably, the encryption is performed on the compressed user data. In one embodiment, the encryption may be a key based encryption although other encryption schemes as are known in the art may alternatively be utilized. In one embodiment, the encryption scheme may be a symmetric AES encryption scheme, in which an AES encryption pass or processes is applied to the compressed user data before calling or performing the inventive information dispersal algorithm. The AES encryption scheme is a key-based scheme, and the key for the AES encryption pass may also advantageously be stored in a storage of the inventive system and service in order to increase security and reliability. The key itself may optionally but additionally and advantageously protected by the user's password to avoid and circumvent potential data or content attacks against the inventive system and service itself. In one embodiment, AES encryption and/or decryption may be performed on the server 102 to provide faster and more efficient encryption/decryption and to offload processor 112 from these tasks.

It may be appreciated that the encryption is optional and need not be provided by the system at all if privacy or security beyond that provide by the IDA itself is not required or desired. In practical terms, however, implementing a backup system wherein one users data, files, folders, or other content are stored even in pieces on another user's computer or storage device, without some form of security or encryption is disadvantageous from a business perspective.

During rebuilding or reconstruction of a user's content, the steps of decrypting and decompressing are essentially reversed. In one non limiting embodiment, encryption and decryption are key based and the key or keys are stored in the management server database.

The rebuilding or reconstruction will also require the decompression of the decrypted user data or content. When a registered user desires to retrieve, recover, or rebuild all or a part of a data set that has been backed up to the service from a computer with which the user registered, the user may make a request for such retrieval through the client program resident on his computer. The request is communicated to the management service which stores the storage vectors in its database identifying all of the storage nodes where segments of the particular user's data is stored. Because the data is redundantly stored on more storage nodes than are required, the service manage who stores the current set of storage vectors that may have been dynamically modified since the original upload or insertion, may identify a subset of currently available and reliable nodes and direct the communication or transmittal of the plurality of portions to the requesting user client. Alternatively, the client may receive instructions from the management service and directly request the subset of the previously dispersed segments. The client computer may then perform what may be considered an inverse or reverse information dispersal algorithm (RIDA) using the subset of non-redundant segments (or a greater number or even all of the segments if some additional error checking or error correction might occur by such use). The original data set has thus been recovered and restored to the owner's computer and the backup and restore operation is successful. Typically, the user will wish to maintain the dispersed backup so that a future retrieval or restoration is possible. In at least one embodiment, the user is given an option to delete his backup data set at any time. Although, this is disadvantageous to the user, some users may prefer to have this option for privacy reasons. The management service may then direct the deletion of the dispersed segments identified to the user, either by actual deletion and overwriting or by deletion from the directory structure so that they cannot be located or accessed, and so that the storage space may ultimately be utilized for other storage.

In an alternative embodiment, where access by a registered user having a backup on the service, is made from a computer or information appliance that does not have the service client installed, then either the client may be downloaded and installed such as for a new user, or the retrieval and restoration may less advantageously be performed through a generic Internet or web interface. Various plug-ins and active-X may be required on the retrieving computer or information appliance device to facilitate the retrieval and reconstruction or when required, the server may broker the retrieval or restoration to the computer or information appliance from which the validated (e.g. proper user ID and user Password) request was made. It may be appreciated that any of the IDA, RIDA, compression, decompression, encryption, and/or decryption may be performed on any of the nodes, management server, or outsourced to another entity coupled on the network, but that certain processes and architectures are more advantageous than others either because of increases in computing power, security, communication link bandwidth, storage device bandwidth, or other factors.

When any of compression, decompression, encryption, and/or decryption are provided in embodiments of the invention, they may be provided by or within any of the registered user client machine that owns the data, in the management service server that is operating to control the service, in one of the storage nodes to which a portion of the registered user's data is to be dispersively stored, or in some combination of these.

Advantageously, compression, encryption, and generation of the plurality of backup segments occurs on the registered user's machine that is uploading the backup to the peer network. It is advantageous to perform these operations here because the uncompressed and unencrypted data is present on the upload client computer and performing these operations on that computer advantageously uses the potentially otherwise unused processing power of that computer. It also prevents placing any unencrypted data on the network in a way that it might be intercepted, and reduces network bandwidth requirements. The upload client user computer may also advantageously generate the plurality of segments and communicate (independently or in coordination with commands from the management server) the segments to the plurality of storage nodes in accordance with the information dispersal algorithm computation. The information dispersal algorithm for any particular data set may be performed either on the upload user computer side or by the management service server, but the most bandwidth efficient choice would be for the client device to perform the algorithm and communicate directly with the peer nodes for storage.

When the management service determines that one or more storage nodes have become unreliable for whatever reason, all or portions of the user's data may be redispered to a different set of storage nodes (where some of the nodes used may be the same and at least one will be a different node). The redistribution of the data does not require either the decompression or decryption of the data. In one embodiment, the encrypted and compressed data is merely moved in tact from one storage node or set of storage nodes to another storage node or set of storage nodes. In some embodiments, only the data earlier dispersed to what has become an unreliable storage node will be moved to a more reliable storage node. In one embodiment, if the unreliable storage node is still available so that the data stored there can be accessed, then the stored data set may be moved or copied to another reliable storage node. In this embodiment, the storage vectors in the management server database are updated with the new storage information. In the event that the particular storage node cannot be accessed, then the data may be regenerated from the data stored redundantly on the other remaining storage nodes. Alternatively, the system may reapply the information dispersal algorithm and generate a new data dispersal strategy. The regeneration of data or the redispersal of data from an unreliable node may depend on how the original data was processed and dispersed, and in particular may depend on the level at which the data was processed.

It may be appreciated that the data may be dispersed at any one or more of various hierarchical levels. In one embodiment, the dispersal may be performed at the file level so that each file may be separately and independently dispersed to a plurality of peer storage nodes. In another embodiment, all files on the user computer that are identified as new (an optionally those identified as having been changed) since the last backup may be processed together and dispersed. In another embodiment, the entire set of the users data are reprocessed and redispersed, but this later option is disadvantageous from the standpoint or inefficient use of processing power and network bandwidth. Advantageously, for purpose of security no matter what level the information dispersal algorithm or procedure is executed at (for example at the individual file level, at the set of files level, at the data or file block level, or at any other level), no entire file is ever stored on a single peer storage device. Even in a case where a file or block of data is a single byte, the single byte file or block would still be padded to a factor of Z bytes and dispersed to M nodes. The result would be M files of length Z where M and Z are as defined above. Therefore security for files or blocks of data of any size is assured.

The manner of dispersal may be different for different portions or backups of the user data. Particularly following the initial post-registration or insertion of a large set of user data to the service, a file set or block mode dispersal may be most appropriate. However, when additional files, folders, content, or other data are subsequently added, it may be more efficient and advantageous to disperse the new data at the individual file level, or at file set level corresponding to only the new or changed data, and not redisperse all of the data on the user's computer each time there is a change.

When either the optional file or content sharing features or the web access features of embodiments of the invention are considered, backing up a user's data at the individual file level has some advantages, including an ability to retrieve any single file with less computational burden and lower bandwidth requirements.

Independent of the level at which data dispersal is conducted, the database on the management server stores information in the form of storage vectors, that inform the manager where all of the files, folders, content, or data are stored and enables the manager to perform the retrieval or reconstruction.

In the event that the user, or another person authorized by the user desires to view or otherwise access only a limited portion of the total backed up data or content for the user, and alternative procedure for partial reconstruction may be utilized. Again, this may depend on the level at which the data that is desired to be viewed was processed and dispersed.

The inventive system and method have strong security and such strong security is unusual for the backup storage industry. In at least one embodiment of the system and method there is a very strong separation of user data and user key information. For example, it may be appreciated that (i) although the user of course has access to and stores his original data on his computer or information appliance, the user never sees or stores the user key (which is only stored on the management server); the management server never holds the original raw user data (and in preferred embodiments, never sees or holds the raw user data), and the data storage nodes never see the user data or user keys and may only store and have the potential of seeing a part of the dispersed data that was advantageously encrypted and compressed prior to the dispersal. Therefore the user data and the key are never in the same location except for very short temporal window during encryption or decryption. Therefore even if two nodes could successfully be attached and compromised, such compromise would not be sufficient to allow unauthorized access and reconstruction of the users actual data, files, folders, or other content stored on the service. One would need to have the user information including the user ID and the user password (plus any secondary authentication optionally in place).

The IDA is similar to that described in the papers so one would need access to several nodes in order to reconstruct the (or a portion of) the user original data.

Since the user data was advantageously encrypted through a cipher before being split up by the IDA, one must have in addition to access to some number Z of the data nodes, also have access to the keys for the user which are only stored in the management server.

It may be noted that the user key may be temporarily resident in RAM in the client for the time it will take to perform the optional but desirable encrypt and decrypt (when such encrypt and decrypt are performed by the client) but it does not live and is not stored in any nonvolatile form on the client side machine and the client software is architected to obfuscate this usage of the key and obliterate the ram storage by overwriting with random data.

For retrieval and restoration back to the user client machine, all communication of data from the storage nodes is of encrypted and compressed data where the retrieving and restoring computer performs the decryption and decompression locally.

For retrieval in the file sharing mode or when files are to be restored to a different computer or machine, enough credentials must be provided to satisfy the system manager that the requested retrieval or restoration should be authorized. The management server may broker the decryption and decompression through either or both of the file sharing block and the web access block to the requesting user. The user can therefore recover all of their data to a new or different computer or information appliance.

It may be appreciated that since for at least one embodiment, the goal is to achieve a measure of consumer level security, and the management server only stores an MD5 or SHA1 Hash of the user password, only the user has the actual password, and therefore for at least some embodiments of the invention, a user providing a password will be entitled to retrieve and reconstruct their data. Other embodiments of the invention may provide additional security or require additional enrollment (such as for example the user of biometric input) and require additional authentication for restoration or retrieval to another new device. Registration of a device may also be required at the time of user registration and retrieval and restoration may require that the restoration be matched to the same device, unless additional information is required. Client nodes will communicate to the management service with HTTPS with client and server certificates. This solution allows for the client device to validate that the service is who it claims to be by validating the certificate and allows for the service to validate that the client is who it claims to be by validating it's certificate.

Aside from breaking into the required Z storage nodes and the management server, the only way to break into the system through the interface is to provide a password which does hash to the stored MD5 or SHA1 has stored on the management server. As increased security may be required or desired, such additional security or authentication may readily be incorporated into the inventive system and method such as a second-stage authentication system.

Even for web access, it is not the management server that is pulling the data down directly, there may still be a client side application in the form of an applet or plug-in. If the local client, such as for example a thin web access terminal or low end computer, does not have sufficient resources or capabilities, the server may broker the retrieval and/or restoration. An inquiry means or program may be utilized to determine if a computer system or information appliance has sufficient processing capability to perform the retrieval or restoration, including any required decompression and/or decryption. The threshold for processing capability may be fixed or may depend on as assessment of the time that may be required given the data set to be retrieved or restored.

The embodiment in FIG. 3 includes a web access node or terminal that may be used by an a registered user, a share user, or in some embodiments of the invention by a new user attempting to make a registration.

In this non-limiting embodiment, the web access node or terminal permits a person (or user) to access the system without the benefit of an earlier registration and may advantageously permit the person to access the system and service without the client software, applet, or application installed on that web access node or terminal. In some instances, such as at an airport Internet access location, an Internet café, or other somewhat public web or Internet access locations (that may be free or fee based), a user is not permitted to download a client software or the local system may deny such download even if the user desires or needs such download.

The web-based access node or terminal may therefore only have a generic hardware and software configuration and no ability for software to be added to support the users desired access. In this situation, the user may rely more on capabilities of the server and minimally if at all upon the capabilities of the web access node terminal or device.

In the non-limiting but exemplary embodiment of FIG. 3, the Web access node or terminal 361 includes a processor 362 and a random access memory (RAM) 364 coupled to the processor. The web access node or terminal may also includes some local storage 375, such as a hard disk drive, solid state memory, or the like for storing an operating system, and application programs of other code. Advantageously, the web access node or terminal will include an Internet or Web browser software application 370 and a network interface module 371 such as a wired network interface card (NIC) or a wireless link, or any other communication interface that permits connection to the same network (possibly through any number of bridges, routers or network translation layers) on which the server 102 is connected.

The management server may provide the capability to retrieve and/or restore user data from a generic web browser that does not include the features and capabilities of the inventive client software, applet, plug-in, or the like. That is, the management server can put the user data back together (e.g., the reverse of the dispersal) and do the decompression and decryption, push the data back to the retrieving computer, and provide a display of the information to a generic screen using the generic browser. In at least one non-limiting embodiment, an active-X component or other program will be provided on the retrieving computer to offload the processing from the management server to the machine on which a portion or all of the user data is to be retrieved and/or restored. It will reassemble, decompress, and decrypt them in a process that is essentially the reverse of the upload associated with the backup.

However the server provided approach is disadvantageous in many ways. Firstly, a lot of server processing power is being utilized as well as bandwidth being consumed. This approach is therefore usually limited to retrieval for practical and business reasons. In at least some non-limiting embodiments, the initial upload and information dispersal is performed by the registered client side computer or information appliance. This is not a limitation of the invention, but a practical preference.

For retrieval access, the capabilities may be provided in the web access node or terminal may for example be provided by a Java Plug in or Active-X control, or by analogous means, that are accessed from the service web site or server, which may usually be available even on low level computers or terminals. It would thus be possible to perform the reverse of the information dispersal algorithm, decryption and decompression, and building and putting the files back into the file system. In general, so long as a communication can be established with the server 102, and the user can add a storage device that provides accessible storage either for uploading or downloading data to or from the system and service, the user will be able to interact with the system. In one embodiment, the user may provide this storage using a USB flash memory card or other similar means.

The inventive system and method leverages the unused and available spare space on consumers PCs or other information appliances that are available or may become available in the future to store other different user's or consumers' backup content. It may be appreciated in light of the description provided herein that future generators of digital content may use or store the generated digital content on devices, storage systems, information appliances, or media devices different from personal computers, and that embodiments of the invention pertain to user or consumer nodes different from personal computers and that the storage devices and subsystems within such nodes may be other than hard disk drives, optical drives, solid state memories, or any other storage device or media.

Peer-to-peer communication and networking technologies and methodologies are combined with a service manager advantageously located on a management server to direct and control operation of the system. This managed peer-to-peer hybrid configuration is leveraged to enable these individual personal computers, information appliances, (or other node or networked devices) to communicate directly with each other for moving around and/or transferring this backed-up content. The peer nodes however do not operate by themselves as they would or might operate in a pure peer-to-peer network or file sharing or file backup architecture. The manager of the backup service and method is integrally involved with initial insert of file, folder, content and/or data storage and dispersion into the network nodes; and, participates in the retrieval, recovery, and restoration of the original files, folders, content, and/or data to the originating computer or to a different computer or device. The service manager may also continually manage the peer network to assure reliable operation and integrity as described elsewhere herein.

In addition to the inventive system architecture, the invention also provides a service and a service manager component that manages the individual computers or information storage nodes and storage devices at those nodes on the Internet to decide which peer nodes are the most appropriate nodes on which to store individual user's content. By way of example but not limitation, the selection of the most appropriate node may be based on one, more than one, or any combination of such factors as: total storage capacity available, history of reliability or failure, uptime or availability on the network, storage device bandwidth, existing backup for the same or other users, presence on-line or on-network, actual presence in one physical location so that if it is a mobile device like a notebook computer it may be marked as less reliable than a fixed computer (gets a lower score, network connection and speed and/or bandwidth between the peers or between either peer and any optional server, geographic location of the peer, relative time between or absolute time at the backup user location and other subscribers locations, geo-location (IP based) with preference to higher score for storage node geographically close to user rather than across the world, national or legal restrictions relative to content, Internet Protocol based location determination, determination of device mobility or stationary character, and any combination of these. Other factors appropriate to the network as a whole, to particular users or user groups and/or locations may also be considered.

In the event that a user requesting registration with the service and therefore needing to provide storage on his/her computer's storage device as one of the storage nodes that other users may access, does not appear to have a reliable storage device, the system may message the user indicating the assessment that his/her computer has a low reliability, and that if the user wants to continue using the service, that user will need to increase the reliability of their storage to the service community, either by taking steps to increase reliability or purchasing some other after-market storage solution like a NAS. Such steps may for example include one or more of leaving the computer connected on-line, by outsourcing the storage responsibility to another entity, by identifying an on-line storage device at another location, or by taking other measures to increase reliability of their storage contribution. In one embodiment, the user may pay the service to provide the backup of the user's files if they are unable or unwilling to increase their reliability. In another embodiment, the user may pay an outsourced entity, such as an independent entity of the user's choosing or a partner of the service, to provide storage on their behalf. This is one of the reasons a single user may have multiple storage nodes, as they may store and backup from multiple devices at multiple locations.

It may be appreciated that unreliability is not an indication of bad character or actions of a user. For example notebook computers may have small hard disks, be offline a lot, and move from location to location. As such the notebook computer may appear to be an unreliable storage node. This provides one rationale for a business model that includes partnering with others who can provide reliable storage to provide the user with an ability to backup data while not actually using their own notebook computer for storing the data of others. By partnering with a disc drive or other storage device manufacturer to purchase and set up disc drive to be used as the users surrogate storage node separate from user's computer. Alternatively, the user may arrange to use a portion of storage on a disc farm or other shared storage facility. These and other ways are referred to as outsourcing storage.

This management methodology may actively choose to change the peers and peer node storage device that a user's content is backed up on to resolve issues of unreliable system and/or storage devices. For example, if it is determined that a peer node device or its storage is frequently offline or unavailable or that some data or content are received with apparent errors (correctable or uncorrectable) on a frequency that is above some acceptable error threshold, then the PC and storage device manager may mark that node and its device as a node or device not to be utilized for future storage of other user's content backup. Policies may optionally be implemented to alter the terms under which the owner of that node device and storage such that since that user is not providing a reliable storage for other user backup, either the user may be invited to upgrade his/her equipment, cease using the backup service, pay a fee or an additional fee for accessing other user's storage, or taking other action as may be suggested or required by the system provider.

It may be appreciated in light of the description provided here, that in spite of potential problems that may initially be encountered with a small number of subscriber user computers or storage devices, on the whole, given the built in redundancy of having a plurality of node storage devices and only requiring a smaller number of such node storage devices to be available in the event a recreation of the user content is required, the inventive content restoration and backup service, system and method using a service manager increases the storage reliability and security far beyond what an individual user or a pure peer-to-peer storage solution could provide on its own.

This enhanced security and reliability are facilitation by a novel Information Dispersal Algorithm (IDA), process and computer program. Certain specific information dispersal algorithms have been known before, and in fact one limited example is the Redundant Array of Independent Disc (RAID) storage methodology and storage subsystem architecture, which may be thought of as one limited special case of information dispersal. The basic idea of information dispersal algorithms is that some original information is able to be broken down or partitioned into a plurality of or multiple pieces, but only some subset of the total plurality of pieces are necessary to reconstitute all the original information. Another example of an information dispersal algorithm is suggested in the paper by Michael O. Rabin, entitled "Efficient Dispersal of Information of Security, Load Balancing, and Fault Tolerance" (Journal of the Association for Computing Machinery, Vol. 36, No. 2, April 1989, pp. 335-348.) cited in the background of the invention section, and incorporated by reference herein.

The inventive Information Dispersal Algorithm is designed such that the inventive system management block directs and controls the service so that it determines: (i) how many other different users storage devices will contain some portion of a particular user's backup data, files or other content, and (ii) how many of those different storage devices must be available to reconstitute the user's backup data, files or content. Other differences between conventional approaches and applications on information or data dispersal and the inventive approach and application of information or data dispersal are described elsewhere herein.

Even when the inventive system, method, and service may use or be based on an information dispersal algorithm such as described in Rabin, there are differences in the structure, operation, performance, and applicability of the present invention as compared to Rabin.

For example, one of the primary differences is associated with the management component and the dynamic application of an information dispersal algorithm and approach, as compared to the static approach of Rabin or others. The Rabin IDA algorithm is alone not sufficient to provide the features and operability of the present invention.

In the inventive system and method, not only are parameters set initially, but in addition they may be refined, tuned, revised, updated, and optimized on a continuous basis in an automated or manual fashion. The management of the data and the peer storage nodes is cooperatively intertwined with an information dispersal algorithm, especially beyond point in time of the initial data dispersion.

For example, while a theoretical paper may suggest dispersing data for backup to some number "n" storage nodes, this is not enough, particularly in a consumer personal computer based peer storage system architecture. In fact, where the nodes are located, and how reliable the nodes are important considerations in an Internet environment deployment. At least some of the tradeoffs and optimizations are entirely different from a dispersed information storage system in which virtually all of the peer storage nodes were themselves at managed storage facilities where high reliability might be taken for granted.

In at least some embodiments of the invention, management by watching or monitoring the nodes by pinging the nodes to test for availability and reliability, tracking historical availability and reliability of the storage nodes, moving or redispersing data when a node has or appears to be trending toward unreliability, and other testing and monitoring on a real-time basis. Changes may be made when parameters exceed certain policy or rule based thresholds, and the thresholds themselves may be continually modified. Conventional approaches do not provide these management features that may continuously assess and optionally alter the dispersal of the information, including possibly reassessing and changing the number of nodes, the redundancy factors, and/or other parameters associated with peer node information dispersal.

Recall that with the present invention, it is not necessary to have all of the nodes present to be able to shuffle or create another reliable storage node to replace a node that has gone offline or has show its unreliability. One only needs some subset Z of M total nodes and as long as these Z nodes are available, the data can be redispersed to other more reliable nodes. One does not need to wait for a node to become unavailable to replace it, but one could notice the trend towards unreliability and act.

One particularly advantageous feature of embodiments of the invention is the capability to continually monitor nodes and if a conditional is observed under which some of the storage nodes are unavailable or unreliable, or are showing a history or pattern of unavailability or unreliability, the data may be redispersed in part or in whole to a different set of storage nodes.

For example, if a file, set of files, or other block of data was originally or is currently dispersed onto sixteen storage nodes, and the service manager recognizes a situation in which three of the sixteen nodes have become unreliable, then the service manager in the server may regenerate and redisperse the data on those unreliable nodes to a new set of storage nodes that have history of good reliability. The redispersion may be accomplished by simply moving the data in tact from each of the three unreliable nodes to three reliable nodes if the data stored on the unreliable nodes are available. If one or more of the unreliable nodes is unavailable, which may often be the reason for a determination of unreliability, then the system manager may either: (i) go back to the source computer and recreate the segments of data that would correspond to the data on the now unreliable and unavailable storage nodes, or (ii) reverse dispersal from the remaining thirteen nodes, to recreate the same segments of data that were stored on the now off-line storage nodes, and communicate or disperse these segments to reliable nodes.

Recall that data may be dispersed at any one or more of various hierarchical levels, and that different embodiments of the invention, or even different backups of the same or different users within a particular implementation of the system and method may user or apply data dispersal at different hierarchical levels.

Redispersement may be done on the management server, or by a separate server or engine coupled with the server and operating under the direction and control of the management server, rather than on the user computer. It may also be done from another node on the network, such as from the data owner's computer. In one embodiment, the server may pull the compressed encrypted data from reliable storage nodes unto the server to replicate the condition that existed prior to the original IDA application, and then use the IDA again with identified new reliable storage nodes to go back to generate new storage vectors and disperse the data. It is not necessary to decrypt or uncompress that data because the dispersal can be applied to any data either in original form or in the compressed and encrypted form. In another embodiment, the pieces or segments may be moved, duplicated, or otherwise sent to reliable storage nodes.

It may be appreciated from the description provided herein that not only do embodiments of the invention provide for initial upload or insertion of the user data, and later download or retrieval or recovery of that data (optionally including updates and changes to it), but it also provides a lifetime data dynamic management and control. By comparison, conventional information dispersal schemes and even application of conventional information dispersal schemes alone focused on and were limited to static environments. The system architecture, processing, and method of the present invention are dynamic, and the storage configuration is reconfigurable relative to changing from unreliable nodes to reliable nodes and even to changing the number of nodes needed on an individual user or file (or other basis). For example, if originally a user data set was dispersed to 16 storage nodes and these are found over time to be very reliable, the management server might reduce the number of required nodes to 12 nodes or some other number of nodes with high confidence that the user data can be reconstructed from a subset of these. The manager may continue to dynamically monitor and update so that the number of storage nodes may change up or down from time to time.

Figure 7:
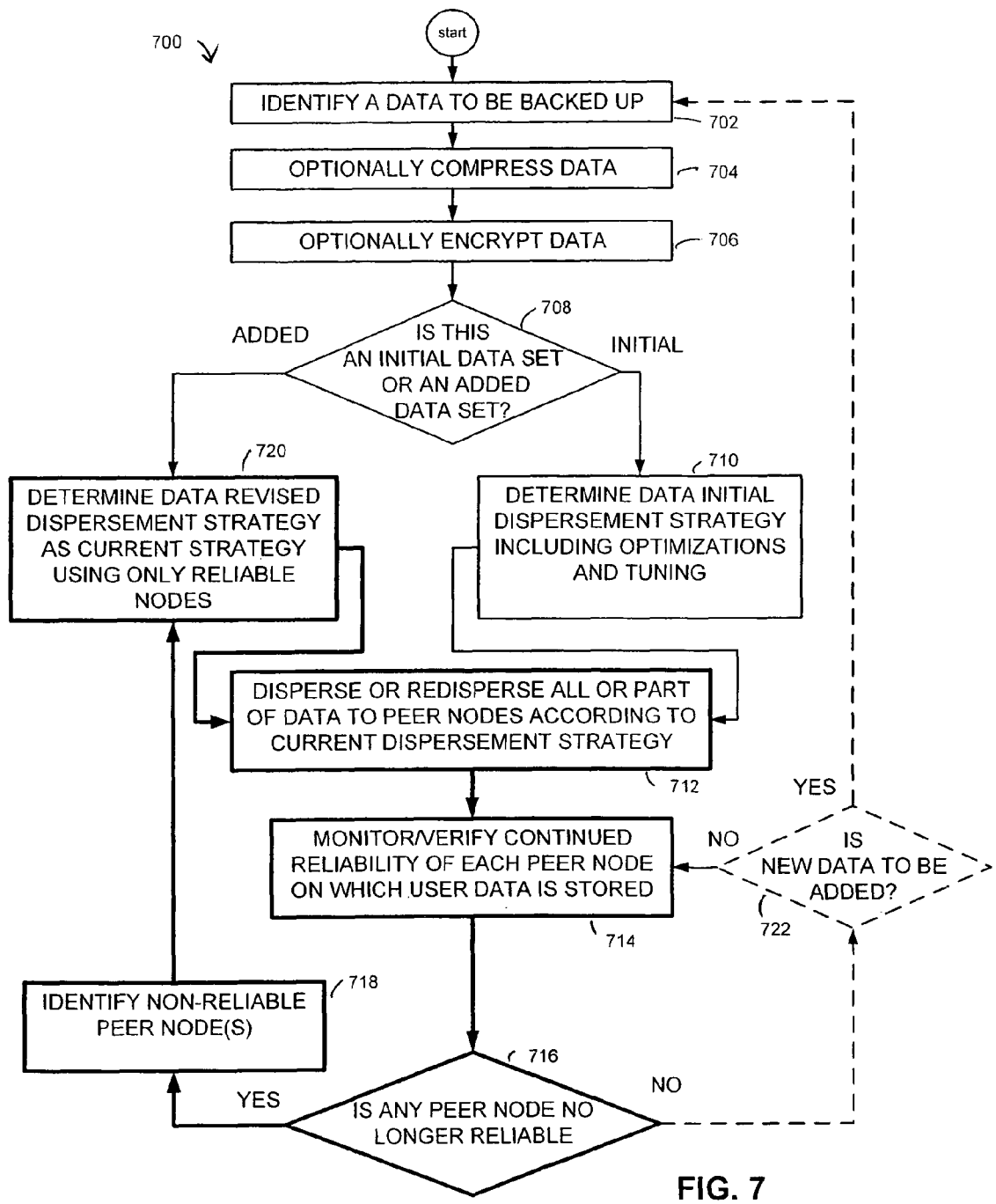
FIG. 7 is a diagrammatic illustration showing an embodiment of an exemplary method for dynamic data or information dispersal and control operation.

An exemplary non-limiting embodiment of a method 700 for inserting data into the system and service and for maintaining the data in the system and service including dynamic data dispersal is now described relative to the flow chart diagram in FIG. 7.

Data to be backed up is identified (Step 702) and optionally but advantageously compressed (step 704) and encrypted (step 706). A determination is made as to whether this is an initial data set or an added data set (step 708) There is not really much difference here except that if it is added data there will be a need to do a new or additional IDA of at least the new data, and the new data IDA process will occur independently of dynamic IDA based on the recognition of unreliable peer nose storage.

If the determination in step 708 finds that it is an initial upload or insertion of data ("initial") then an initial data dispersement strategy is identified which may usually include optimization and tuning for the current set of peer nodes and possibly relative to the user data (step 710). The data is then dispersed (all of the data for an initial dispersement, though the dispersement may be done in pieces if individual file based or in some block that is less than all of the data to be dispersed) to peer nodes according to the current dispersement strategy (step 712). The current dispersement strategy may be the initial strategy if this is the first upload or a dynamically modified and revised strategy if there have been earlier dispersements. After dispersement, or even during dispersement if the system finds a peer node that was going to be used, the system monitors and/or verifies the continued reliability of each peer node on which a user data is stored (step 714). It may do this for an individual user data as a set or maintain a reliability status for all user data nodes. The monitoring may occur in any order and the results maintained in the database for each node. A determination is then made as to whether any peer node has become unavailable or unreliable (step 716). In the determination as to whether any peer node is no longer reliable is negative (No) (step 716), then an additional optional determination may be made as to whether there is any new data to be added to the user's backup (step 722). If the answer is no, then the system and method continue to monitor and/or verify the continued reliability of each peer storage node on which a user's data is stored (step 716). On the other hand, if there is new data to be added (step 722) then the data to be added is identified (step 702), optionally compressed (step 704), and optionally encrypted (step 706). Since this is added data, the determination as to whether this is an initial data set of an added data set is positive (yes) (step 708), the method continues by determining a revised data dispersement strategy using only currently reliable peer storage nodes (step 720). The new data and optionally the new and the initial data is dispersed to peer storage nodes according to the currently identified dispersement strategy (step 714). It may be appreciated that steps 712, 714, 716, 718, and 720 will repeat continuously to dynamically manage the storage and dispersal of the users data. The procedure may be considered to deviate when new data is inserted into the system, or they may be considered to be two independent processes where the existing data is continually monitored, even as new data is added, and then the monitoring continues in its next cycle with the larger set of data and potentially larger set of peer nodes.

It may also be appreciated that although this process has been described relative to a single user's data, the process may also be applied to all of the data on the system for all users and all nodes.

Figure 8:
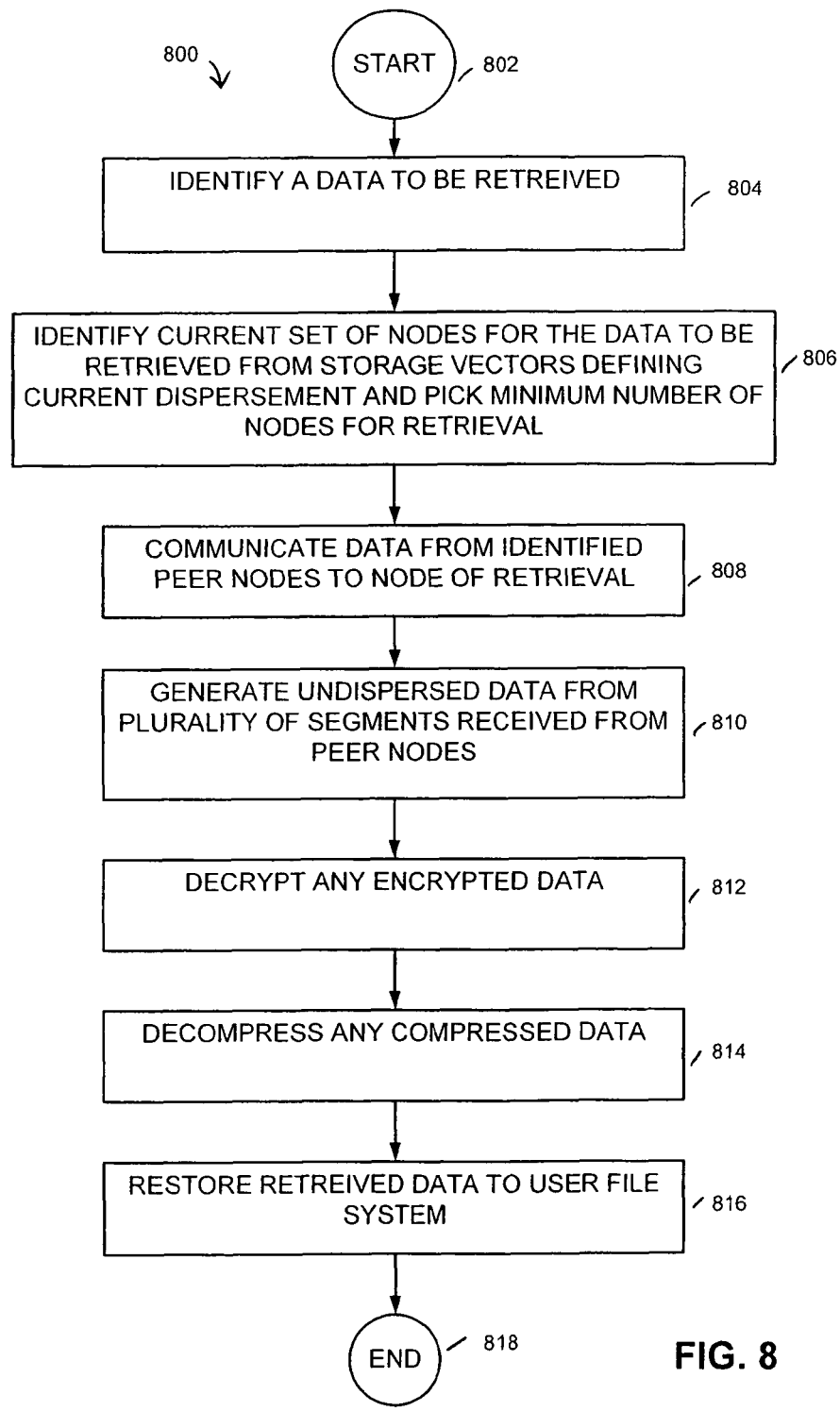
FIG. 8 is a diagrammatic illustration showing an embodiment of a method for retrieving previously stored user data from the inventive system and backup storage service.

FIG. 8 is an illustration showing an exemplary embodiment of a method for retrieving previously stored user data from the system and service. The procedure starts (step 802) by identifying a data or data set to be retrieved or restored (step 804). Next, the current set of peer storage nodes for the identified data are identified from the IDA dispersement storage vectors (or other identifiers) and because they are not all required for retrieval, a subset of the peer nodes on which the data is stored are identified according to some rule, policy, or at random (step 805). The data from the plurality of peer nodes is then communicated or transmitted over the network to the node identified as the retrieval node (which may in some instances be the server) and stored at least on a temporary basis there (step 808). Because each peer node will send only a segment of a multi-segment data set, an undispersed data is generated from the plurality of segments received from the plurality of peer nodes (step 810). Any data that was encrypted is decrypted (step 812) and any data that was compressed is decompressed (step 814). The retrieved and reassembled data is now restored to the retrieval node, usually by the original owning user, and restored to the file system (step 816).

An exemplary use scenario is now described beginning with a users initial steps at registration and continuing through an initial backup or insertion of data into the system and service.

In one embodiment, the backup and content or data retrieval and restore service is a free to the end user or subscriber. In one embodiment of a fee user service, revenues for operating the service and any profits may be derived from advertising, from partnering arrangements, a combination of these, or from other sources. In another embodiment, a fee may be charged to a user or to a group of users for using or accessing the service or content or data stored by the service. The fees may be fixed, may differ depending upon the number and/or size of data stored, the number of accesses in a given period of time, the interaction or non-interaction with service partners, or according to other factors.

Figure 6:
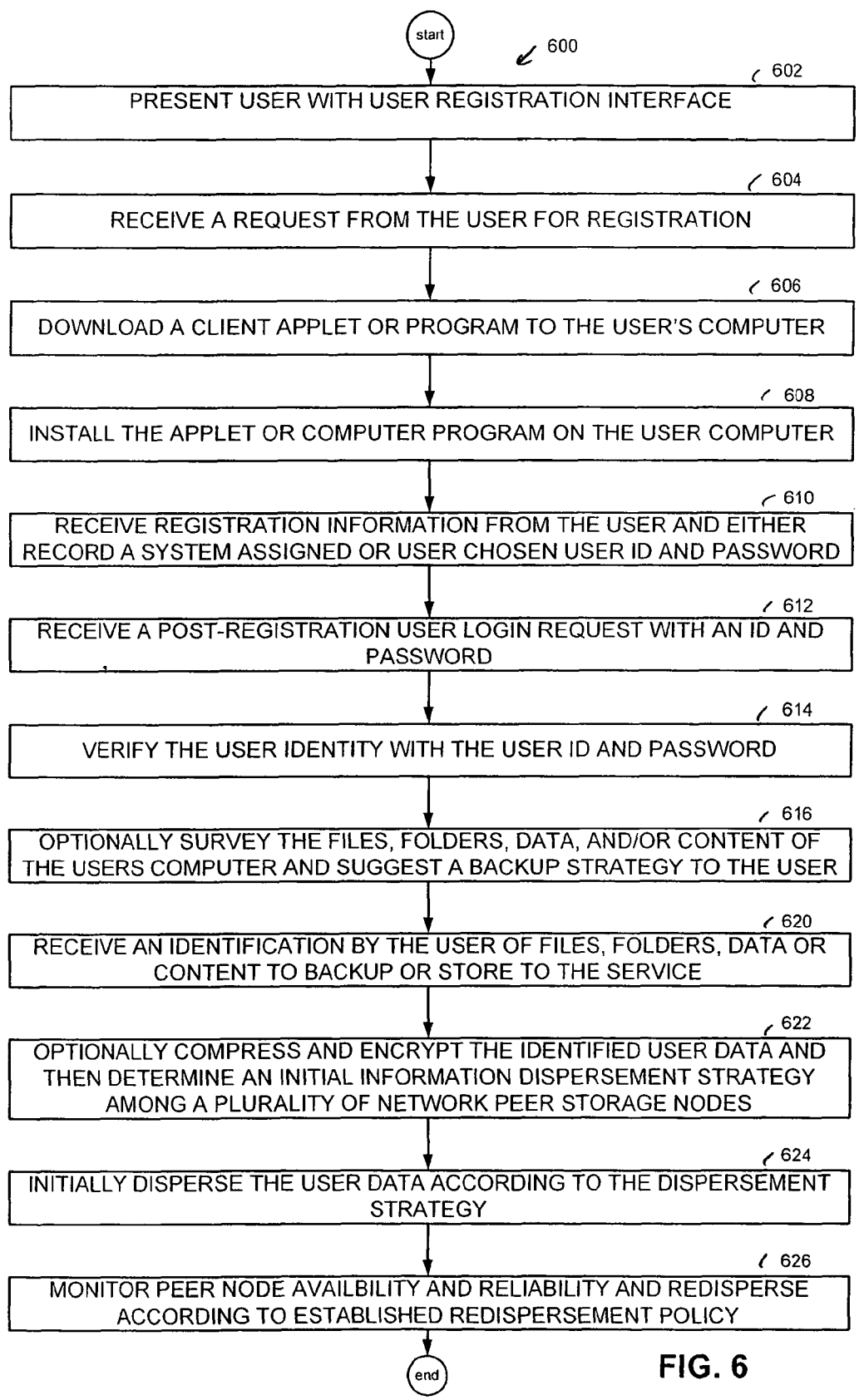
FIG. 6 is a diagrammatic illustration showing an embodiment of an exemplary use scenario and associated operation.

A non-limiting exemplary use scenario and associated operation is now described from the perspective of a new user accessing the service for the first time relative to FIG. 6. This process may be highlighted as follows with further explanation of optional elements in the following paragraphs as well as elsewhere in this specification.

This procedure 600 may be summarized as follows and is depicted in the exemplary flow chart in FIG. 6. First, the system presents user with user registration interface (Step 602). The system then receive a request from the user for registration (step 604) and in response thereto, download a client applet or program to the user's computer (step 606). The applet or computer program is installed on the user computer (step 608). Next, the system receives registration information from the user and either record a system assigned or user chosen user id and password (step 610). In the exemplary embodiment, the system receives a post-registration user login request with an id and password (step 612). The system verify the user identity with the user ID and password (step 614). Optionally the system surveys the files, folders, data, and/or content of the users computer and suggest a backup strategy to the user (step 616), and may receive an identification by the user of files, folders, data or content to backup or store to the service (step 620). Optionally compress and encrypt the identified user data and then determine an initial information or data dispersement strategy among a plurality of network peer storage nodes (step 622). The system may then initially disperse the user data according to the dispersement strategy (step 624). The system service may then monitor peer node availability and reliability and redisperse according to established redispersement policy (step 626). This last step may be performed iteratively, and the user may also add addition data to the backup storage set which may also result in additional data dispersal and possibly redispersal of other data that was earlier uploaded to the system and service.

A user desiring to become a registered user or subscriber of the inventive service may initially access a service web site which may have been identified to her/him by various methods. The user may be presented with a menu or a button inviting the user the register and the user then presses a hot spot or button on the display or otherwise initiates downloading of a thin client software application program or applet. In one embodiment of the invention, agreeing to download some form of computer program code, applet, plug-in, or the like is required for registration as a user entitled to store or backup their data on the network. Other embodiments, of the invention, including some Web access-based use, may utilize generic web browser code and may not require downloading of service specific software, however this type of use may have limitations as described elsewhere herein.

Versions of the service client are available for different computing platforms such as IBM compatible PCs and Apple Computer Macs, as well as other computing platforms or entertainment systems, devices, or other content generation or storage devices. In one embodiment, the user may be presented with a list of systems, or devices, or asked to identify their system or device type. In another embodiment, a single client program is compatible with a plurality of device types so that no user selection is required.

The applet, software, plug-in, or other client software or code is then installed, either automatically, or under control of the user or by an installation wizard interacting with the user and the user's computer, information appliance, or system. It is anticipated that computers, information appliances, entertainment systems, and media generation and playback means may change over the coming years so that it should be understood that computer and/or information appliance are intended to include their common and usual meanings as well as systems and devices that have a capability to generate and/or store data, files, or other content, possibly including but not limited to moving or still pictures and images, music, voice recordings, text documents, business documents, spreadsheets, and any other type of digital information.

Once the applet is installed, the applet or continued interaction with the web site, will ask the user for a user identification (ID) and a password. Alternatively, the system may assign a user ID and either a permanent or temporary password. The identification may be any name, number or other identifier that the user (or system) may care to use or assign. In at least one embodiment of the invention, the system does not store the user password but only stores and relies upon a match to the hash of the password when a registered user attempts a login. In one embodiment, the registration process may require or request that the user input additional information, such as for example but not limited to home and/or business address information, full legal name, telephone number, areas of interest, password recovery related information, or other information that may be desired for security, marketing, system and service improvement, or other purposes. Privacy policies may also be presented and the user requested to approve such privacy policy. However, in at least one embodiment only an account identifier and a password are required for registration of the user who then becomes a subscriber.

The client applet, once installed, can then communicate directly back to the service management server over the Internet, web, or other network connection or communication established between the user computer or information appliance and the service management server. The client then registers the user with the user identifier and user password. Secure communication schemes as are known in the art may be utilized.

In one embodiment, after registration has been completed, further interaction may be performed between the user and the service using an Internet web based interface. Other embodiments of the invention may provide for direct connection or non-Internet based interaction. Other embodiments of the invention may be deployed and supported over intranets.

The web site interface provides a login page. In at least one embodiment of the invention, the web site may also provide a registration page. After registration from the web page, or during such registration procedure, the client software may be downloaded as described.

In one non-limiting embodiment, when the registered user logs into their account, they will see a list or other presentation of all of their files or content that is backed up or stored on the peer nodes. Initially, this list or presentation may be empty or blank since they will not have uploaded any files, folders, or content to the service. They may also optionally be presented with a list or other presentation of content on their own computer, with optional indications as to what has been backed up and what has not been. Graphics and colors may advantageously be used to highlight backed-up and/or non-backed-up files, folders, or other content. In one embodiment, these lists are generated and/or maintained by the service client software executing an inventory procedure on the user's computer or other information appliance. In another embodiment, the service management server may query and examine the user's computer or information appliance directly, but this is not preferred. In one embodiment, this inventory may be performed periodically or according to other rules or policies, and/or at the request of the user.

In one embodiment, when the registered user first logs into the service, the service recognizes that this login is the users first post-registration login (or recognizes that the registered user has not yet identified any files, folders, or other content for backup), and presents a backup wizard to assist the user in his/her interaction with the service. Various interactions or dialogs may be used, and the use of wizards are known in the art of computers and are not described in detail here.

The wizard may ask the user what files, folders, or content the user wants to backup. The client software has separately and in the background done a search of all or an identified portion of the users computer or information appliance or device, and identified files, folders, or content that may be appropriate for backup by the service. In one embodiment, the client may optionally request that the user may limit or otherwise direct that the client or service limit the search to particular storage devices, folders, files, file types, content, or content types, or according to any other criteria. This may for example be done for user privacy reasons. The client and/or service may also optionally constrain the files, folders, or content. By way of example, but not of limitation, the client or service may constrain the backup according to maximum file sizes, a maximum total backup file or content size, to particular file or content types, or according to other criteria. Various search filters may be provided by the client or service to assist the user in identifying files or content for backup. The client or service may optionally also provide means for identifying copyrighted content or other content that may be subject to digital rights management.

In at least one embodiment, the service is provided as the users backup and the files or content are stored in a manner (described herein elsewhere) that makes it impossible for any other access than by the user so that event the backup of legitimately obtain copyrighted material does not present any copying or file sharing issues. In one embodiment, copyrighted material having a digital rights management feature may be backed up by the user, but prevented from being restored to an account other than the account associated with the registered user. More particularly, embodiments of the invention may optionally provide for a form of content management that permits user created files to be shared with an identified group (such as a limited number of friends and family members) associated with the registered user, but that may prevent files or content that may be subject to copyright from being shared with other registered or non-registered users. In at least one embodiment, a maximum group size is provided so that less than the entire world is permitted access to a registered users files or content on a shared basis. Embodiments of the invention may also or alternatively provide that some maximum number of file or content sharing logins or access may occur within a defined period of time, or according to other criteria.

Returning to the description of the procedure, the wizard may for example recognize that there are pictures in a "My Pictures" folder, that there are music files or content in a "My Music" or "My iTunes" folder, and recommend that certain files, folders, or other content are appropriate for backup by the service.

If the user then indicates, such as by clicking a button on the web screen, that the user does wish to backup some set of files, folders, or content, then the service server will communicate back to the client that the identified files, folders, or content should be backed up. In one embodiment of the invention, an optional version monitoring and control may be provided so that a creation or modification date of a file, folder, or content item that has an otherwise identical name is monitored and a determination made as to whether that item is a duplicate, newer replacement, and if it should be overwritten or replaced in the backup, a second copy bearing a version identifier or number appended to the file, or other action taken autonomously by the service or as an interaction with the registered user's input.

The server communicates the criteria for backing up the user files, folders, and/or content and client is thereby made aware of files (or file types), folders, and/or other content that should be backed up. In one embodiment, the server identifies to the client that files or content in a defined set of folders should be backed up. In another embodiment, the server identifies to the client that certain new file types should be backed up independent of the folder, so that by way of example but not limitation, all JPEG (*.jpg) picture files or all MP3 (e.g., *.mp3) music files should be backed up if they are detected anywhere on the users computer or information appliance. The identification of folders is advantageous as it reduces the search and computational burden of the client when it performs a search. In one embodiment of the invention, the client or the applet or program element may optionally update a database or list when ever a new file or content of an identified file or content type is created or downloaded to the user's computer or information appliance, thereby eliminating the need to perform a search. In one non-limiting embodiment, the client or other applet or program element executing in the user computer or information appliance may monitor the number, total size, last backup, and/or other information associated with files, folders, or content and recommend a backup be performed.

Since the client is now aware of these folders, file types, content types, or other backup criteria, the service client program may optionally but advantageously monitor or look at the folders (which may for example be the entire storage device or devices connected to or otherwise identified with a user's computer or information appliance, or only a folder or subfolder of that or those devices) for new files or content meeting the backup criteria. This monitoring may be performed according to some rules or policies, and may by way of example but not limitation, monitor more or less continuously, at periodic intervals set by the system or user, or according to any other procedure.

Initially, when the user first identifies the folders to be backed up, all of the files, subfolders, or other content meeting the backup criteria will be backed up. Subsequently, the client will monitor for any newly added files or content and backup that content. In one embodiment, newly added files are backed up by adding the additional files or content to the previous backup set. In another embodiment, the newly added files are backed up by creating a second, third, fourth, or subsequent backup set so that a single user may have more than one dispersed data set backup. In one embodiment, the multiple backup sets are maintained separately over a period of time, though the user may not be aware of this separation which is transparent to the user. In another embodiment, any multiple backup sets are recombined according to predetermined or dynamically determined policies or rules. The rules or policies may for example take into account such factors as the number of separate backup sets, the size of any one or more of the data backup sets, the frequency with which the user add files, folders, or other content, the availability of processing power and/or bandwidth to perform and required compression/decompression, encryption/decryption, and/or dispersal to the same or a different set of peer storage nodes. In one embodiment of the invention, files (or blocks of data) identified as being deleted by a user are flagged or otherwise identified as being deleted in a files table in the database on the management service. In one embodiment, the files even though marked as deleted may be retained so that they are still recoverable if the user changes their mind or made a mistake. In one embodiment, a rule or policy may be utilized so that the files are deleted after some predetermined or dynamically determined period of time. In another embodiment, the user is sent a message requesting verification of file deletion. In one embodiment, this verification is requested at the time the files are deleted, while in another embodiment, the verification is requested at a later date. In one embodiment, the later date may be between a month and a year after the user indicates the files are to be deleted.

In one embodiment, the backup methodology is tuned to a consumer market segment in which pictures, images, video, music files, and similar consumer oriented content is created and placed onto the user computer or information appliance or downloaded from another source and not changed, therefore change or version control is not required or even necessarily useful. In one embodiment, a change history for a file or files may optionally be maintained if desired. Therefore the primary goal of this non-limiting embodiment is to identify new files or content by name that has not been previously backed up and either back it up or identify it for backup at the next scheduled backup. Various different backup initiation criteria may be applied as it may be appreciated that it is not necessarily efficient for a backup to be preformed immediately following creation or downloading of a new file or content. In one embodiment of the invention, a backup may be performed according to a time schedule, according to a number of new items that have been identified for backup, according to a total file size of files or content identified for backup, or according to a combination of these criteria alone or in combination with other factors or criteria.

In other embodiments of the invention, change, modification, and other revision control may be provided so that the user may at least be made aware that multiple versions of the same named file or content may exist on their computer or information appliance and/or in an existing backup or backup to be created. A user may then be given an opportunity to choose how such changed, modified, revised files or contents should be handled. In one non-limiting embodiment, a software program or tool may be used or provided to identify differences between multiple versions of a file or content.

In one non-limiting embodiment, small or low-resolution so called thumbnails may optionally but advantageously be created from at least certain picture or image types and stored on the service server so that if a user wants to review what is backed up and cannot associate a file name, such as for example, one of the common digital camera file names like "DSC_0257.JPG", the user may view a thumbnail image of that file. Storage of the thumbnail on the server also alleviates any possible need to retrieve distributed portions of the users backup from a plurality of nodes and perform any decryption and/or decompression that would be required to view the backed up user image file. In one non-limiting embodiment, the invention may also provide reduced resolution versions of other file or content types, such as by way of example but not limitation, thumbnails or equivalent of Adobe™ Acrobat files, Microsoft™ Word documents, spreadsheet documents, or any other type of document or file. In yet another non-limiting embodiment, short versions (for example a few seconds) of music files, video files, or other audio or media content may optionally but advantageously be stored on the server for similar purposes of review by the registered user associated with that content (and when optionally provided by an authorized group associated with that registered user).

The optional provision of image and/or audio thumbnails provides significant advantages for a user's review of backup and retrieval as well as for retrieval or viewing from a computer or information appliance different from the computer or information appliance that actually may still store the original images or music files. This situation may occur, for example, either when a registered user needs to access or restore files or content to a computer or information appliance that is different from (and possibly geographically remote from) the computer or information appliance where the originals are stored, or when a member of the registered user's group (e.g., friends and family) want to access the service and view only selected ones of the users content items, particularly images or pictures. Recall that controls may be provided that may control, moderate, or limit multiple simultaneous access that might be in violation of copyright or other file or content sharing restrictions. In one embodiment, different restrictions may optionally be implemented for different users based on such factors or criteria as the users registered country or state, the location of the users computer or information appliance based on signals from the users wired or wireless network interface. Restrictions on registration or access may also be implemented based on a registered user or associated group members (e.g., guest) identified age, country, geographical location, or according to other factors or criteria.

The registered user may also optionally identify other users or potential users (also referred to herein as guest users) with folders, subfolders, files, content items, and/or content types. In one embodiment, guests are identified by the registered user to the service using their email addresses. Other embodiments may use other identification means.

Guest users may be registered users or non-registered users when they are identified by the registered user. In one embodiment, guest users are either required to register or are requested to register. In one non-limiting embodiment, a guest user registers and obtains a new user ID and their own password. The user ID and password may only be used in association with their access to the registered users group. A guest user may be a member of many different groups and may either have different IDs and passwords for each group, or have a single ID and password that permits access to all of the groups to which they have been associated.

In one embodiment, guest users may remain unregistered even after accessing a registered users content, or may register. In many instances a guest user may not have their own content that needs backup so that there may be no motivation to register. One example, may be an elderly gentleman who has a computer or information appliance but does not create, download, or otherwise have a need for backup but wants to be able to view and occasionally download pictures of his granddaughter or grandson.

Again, the number of guest users may be limited so as to prevent at least the appearance of offering a file sharing service, particularly if some of the backed up content has use restrictions associated with the content. However, for user authored or other content with which no use restrictions apply, the number of guest users may be unlimited or substantially unlimited. In one non-limiting embodiment, a burden may be placed on the registered user to separate other's copyrighted content from content not subject to use or sharing restrictions. In another embodiment, the service attempts to identify content that is or may be subject to use or sharing restrictions, and to prevent sharing of such content. In one embodiment, the service may also limit or prevent the generation of image or audio thumbnails of such content.

It may be appreciated that even when some file or content sharing may be permitted, that the service is providing only a limited private shared network within a registered user's share group and is not a public file sharing network. Embodiments of the invention may provide for limiting the number of guest or share uses. For example, non-limiting embodiments of the invention may provide for 10 share users, 20 share users, 50 share users, or any other number of share users associated with a registered user. Since access by share users is controlled by the service management server, the number of share uses may be strictly limited.

In one embodiment, the sharing is performed at the folder level for ease of administration. For example, a registered user may identify the contents of their "My Pictures" folder, or the contents of a "Laura's Birthday 2006" folder as being a shared folder. Other schemes for identifying shared content may alternatively be implemented.

When the service server receives the email addresses of a registered users group members, the server sends an email message to each of the identified group members informing them of their status as a member of a registered users share group. In one embodiment, the email message includes a URL link, and the message invites the email recipient to click on the link to access the service. In one non-limiting embodiment, the email message may include a personalized message from the registered user. For example, the message may say that "Michael has decided to share his pictures with you, click on the link to access the web site to see his pictures." In another embodiment, the email message may include one or more content thumbnail images belonging to or associated with the registered user.

The recipient may then click on the link to access the web site associated with the link and see files or other content that they have been invited to share. This linked web page may be the same web page or a different web page than the web page a registered user accesses to log in to the service. If the recipient of the email is already a registered user, then when that registered user accesses the linked web page, he/she may log into their own account and then view a list of share groups that they belong to. Various interfaces may be provided and the interfaces described here are provided as examples and are not to be construed as limiting in any way.

In the event that the recipient is not a registered user but wants to access the shared files or content, the invited guest may access the shared files without needing to download the client as was otherwise required for a new user wanting to use the service for file, folder, or content backup.

In one embodiment, when the registered user identifies one or a plurality of share group members, entries are written into the database that identify the share group members, and optionally provide a unique but temporary password for at least an initial login by the guest share member. The guest share member if not already registered will be asked (or forced) to change the password after logging in. The invited guest or share user will then be asked in they would like to become a registered user entitled to use the free service for backing up their files, folders, or other content. The invited guest user may then be encouraged to register so that not only may they view other's shared content, but may also utilize the service for their own backup and optionally to share some or all of their own content with their own share group.

In one embodiment, the service may generate revenue based on advertisement (ad) placement either in the form or banner ads, pop-up ads, or other forms of add placement known in the art. Revenues may also be generated based on ads-presented, ads that have been clicked through, generated sales, or other advertisement or sales based models as are known in the art. Revenues may also be generated for example, by partnering with picture or photo printing entities so that a registered user and/or share group guests may be presented with offers for Internet or web based picture printing at favorable rates. In one embodiment, a database may optionally be maintained to identify digital or electronic images that have never been printed in a hardcopy format, so that not only does the registered or guest user have an opportunity to maintain an archival backup but also a convenient means for obtaining printed photographs. Similar offers may be presented for DVD compilations of pictures, for user generated video content, or for other files, folders or content. In one embodiment, the invention provides of receipt of a share of revenues or profits derived from a users content and offers presented to the user when they access the service. It may therefore be appreciated that service revenues may be increased by generating excitement at the service web site and that frequent visitation to the service website by registered users and invited share group members is to be encouraged. In this regard, various promotions, contents, and/or incentives as may be permitted by law may be presented on the web site by the service In the event that the invited guest share group member is already a registered user, they will be invited to enter their own registered user information and password, to obtain access to not only their own account but also to share groups that they are associated with. In at least one embodiment, this prior registration may eliminate any need for a new account or password.

It may be appreciated that since in at least one embodiment, the service is a free service, for a registered user that uses the service only to provide an emergency backup in the event the user's own file storage system fails, and in the most extreme case never again accesses the service, then no revenue will be generated. However, since the cost for storing an incremental users files, folders, or other content is relatively small, there is little or no cost or loss for this type of user. Revenue is advantageously generated by the above advertising and partnering revenue models. In general, the more frequently a user access her/his content (or their share group members access the content) the more opportunity for revenue generation. The provision of share group members email addresses also provides an opportunity for directed advertising. In one embodiment, the share group member may be sent messages indicating that additional content is now available by clicking a link. Advertisements may be presented in the email itself, or through the link, or at the service web site when the recipient attempts to view the new content. In one embodiment, an order for prints of new pictures may be provided using the thumbnails. The share group user may then follow-through with the print (or other media) order or edit it in some way before placing the order. The order may require further identification of the user, such as a name and mailing address, as well as credit card or other payment information. These purchase interfaces may advantageously be performed over a secure connection as is known in the art.

In at least one non-limiting embodiment, advertisement and/or partnering relationships may be customized or personalized based on a perceived registered or guest user actual or derived characteristic, and/or based in whole or in part on information derived from a registered users stored content, and/or from the content identified for sharing to members of a registered users one or plurality of share groups, and/or from the content that is actually viewed or otherwise accessed by one or a plurality of members of the share group. Advantageously, the service will take due regard for registered user and guest share group member privacy and either inform the user and/or guest of their privacy policy and/or obtain permission before performing an analysis of the content, data mining, access patterns, user or guest profiles or purchasing patterns or the like.

It may be appreciated that the service server only stores administrative information to permit recovery and reconstruction of a users files, folders, and content; it stores the file, folder or content name but it does not store the users actual original data. In some embodiments, the service server may store thumbnails to assist the registered user and any share group members in accessing the original data. This more limited storage provides at least somewhat of a privacy advantage as compared to other file backup services which may typically have access to an entire user content on a server. Recall also that none or the storage nodes individually store sufficient information to construct any single file, folder, or content items; or in the event that a single file, folder, or content item may be of such size (e.g., small) and character that it is dispersed only onto a single node's storage device, the effort to identify, decrypt and decompress that item, would make access to that item impractical.

Non-limiting embodiments of the invention may provide for advertising based on file or content names alone. Other non-limiting embodiments may analyze picture or photo content and provide advertising based on identified content or subject type. Other non-limiting embodiments may analyze music content and provide advertising based on identified music content or type. Still other non-limiting embodiments may collect and store meta data associated with picture files, audio or music files and the like, and this may provide an additional basis for extracting context information that may be used for directed or personalized advertising and marketing.

Although the management server does not store user content, and in many embodiments of the invention, does not even process or touch the content, the management server may have access to full uncompressed content, including for example to video content. This provides an opportunity for partnering in the form of sharing content with other organizations as well as with individual guests. The sharing may be user permission based either at the time the user registers, or at a different time. In one non-limiting embodiment, a registered user may include a backup folder for video content. The client or server may identify this content as being suitable for upload and sharing on the Google acquired YouTube, Inc. video web site, and the user may be asked or incentivized not only to perform the backup, but additionally to upload the content to the Google acquired YouTube, Inc. video content posting and share web site. The content may optionally be passed through a conversion or transformation process, filter, or conversion, so that the content to be shared with the Google acquired YouTube, Inc. video site is in a compatible format. Similar or analogous process may be provided to communicate or post content to other potential partnering sites such as My Space or other social networking sites.

The inventive system, method, and service may also be beneficial in a business or corporate environment. In such an implementation, the network may be a closed network or intranet rather than the Internet, or may include components of an internal closed intranet and the Internet. In one embodiment, a company may have terabytes of unused space that may be offered to employees for work based and/or personal file backup at no cost to the employee or to the company. In this case, the system and software may be offered on a non-exclusive licensing basis and revenues collected on this basis.

Other optional but advantageous features may be provided. For example, once the peer-to-peer storage network is in place and backing-up the user's files, additional value-add services are offered to the user, including web-based access, file sharing and partnering with other sites that require user content. These additional services leverage the features of the peer storage network to provide the functionality.

The first value-add service is a true web-based access method to a user's own files. This web-based service provides full access to all the backed up content from any web terminal. Since the actual storage is in the peer storage network, the user's own PC does not need to be on or reachable at the time of remote access for the ability to browse and download (restore) the files from the set. Obviously restore is just a special case of remote access and thus is achieved via this same method.

The second value-add service is a web-based sharing service. Since the most likely backed-up content by consumers is digital photographs and other user-created content, it is the same content that users are going to want to share with friends and family. The same process of remote access and restore (limited to content the owner chooses to share) allows other designated users to access and share the content of these users.

Additional Description

As used herein, the term "embodiment" means an embodiment that serves to illustrate by way of example but not limitation.

It will be appreciated to those skilled in the art that the preceding examples and preferred embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

We claim:

1. A server-managed system for providing data peer-to-peer over a wide area network, the system comprising:
    a first user client device for storing at least one data file on a data storage device of a first user and for providing one and only one connection from said data storage device to a wide area network;
    a management server, coupled to the first user client device and to a second user client device through the wide area network, comprising a database for storing access information to the first user client device, said management server for:
        receiving a request, over the wide area network, from the second user client device for at least one data file of the first user;
        identifying, using the access information, a location on the wide area network of the first user client device for accessing the data file;
        accessing the first user client device through the wide area network; and
        directing that the data file of the first user be transmitted peer-to-peer from the first user client device across the wide area network to the second user client device.

2. The system as set forth in claim 1, wherein the access information comprises a user share group specifying one or more authorized users of one or more user client devices authorized to access one or more data files of the user on the first user client device.

3. The system as set forth in claim 2, wherein the first user client device comprises a shared folder that identifies a plurality of data files of the user, and the user share group specifies users authorized to access the shared folder such that the second user client device of the authorized user may access any data file in the shared folder.

4. The system as set forth in claim 1, wherein the management server is further configured for:
    receiving a request to upload remote data from the second user client device to the first user client device; and
    transmitting the remote data from the second user client device for storage on the data storage device.

5. The system as set forth in claim 1, wherein the access information comprises users authorized to access one or more data files via the first user client device, such that a data file is transmitted to the second user client device if the request for the data file is from an authorized user, and a data file is not transmitted to the second user client device if the request for the data file is not from an authorized user.

6. The system as set forth in claim 1, wherein the data storage device comprises a networked attached storage drive.

7. The system as set forth in claim 1, wherein the access information comprises a guest user and a registered user, wherein the guest user does not provide a username and password for accessing files on the first user client device, and the registered user provides a username and password, wherein the management server allows the guest user to access a first set of files on the first user client device, and allows the registered user to access the first set and a second set of files on the first user client device.

8. A method for sharing data peer-to-peer over a wide area network between a first user client device and a second user client device, the method comprising:
    storing, at a management server, access information to access a first user client device of a first user, wherein the access information comprises a user share group that identifies one or more users of one or more user client devices authorized to access one or more data files of the first user of the first user client device;
    receiving a request, at a management server, from a second user client device to access at least one data file across the wide area network;
    identifying, using the access information, a location on the wide area network of the first user client device for accessing the data file;
    determining, at the management server, from the access information whether the second user client device is a part of the user share group;
    if the second user client device is a part of the user share group,
    accessing the first user client device through the wide area network; and
    directing that the data file of the first user be transmitted peer-to-peer from the first user client device across the wide area network to the second user client device.

9. The method as set forth in claim 8, further comprising:
    generating a shared folder at the first user client device that identifies a plurality of data files of the first user and specifies the user share group.

10. The method as set forth in claim 8, further comprising:
    receiving a request to upload remote data from the second user client device to the first user client device; and
    transmitting the remote data from the first user client device for storage on the data storage device.

11. The method as set forth in claim 8, wherein accessing the at least one user client device through the wide area network comprises accessing a data storage device through the at least one user client device.

12. The method as set forth in claim 8, further comprising:
    receiving information from a guest user that does not provide a username and password for accessing files on the at least one user client device;
    receiving information from a registered user that provides a username and password;
    allowing the guest user to access a first set of files on the at least one user client device; and
    allowing the registered user to access the first set and a second set of files on the at least one user client device.

13. A computer readable medium comprising a set of instructions, when executed by a computer, causes the computer to perform a server-managed method for sharing data peer-to-peer over a wide area network between a first user client device and a second user client device, the method comprising:
    accessing, from a first user client device, at least one data file on a data storage device of a first user;
    providing a connection from the first user client device to a wide area network;
    storing, at a management server, access information to access the first user client device;
    receiving a request, across the wide area network, at a management server, from a second user client device to access at least one data file from the first user client device;
    identifying, using the access information, a location on the wide area network of the first user client device for accessing the data file;
    accessing the first user client device through the wide area network; and
    directing that one or more data files of the first user be transmitted peer-to-peer from the first user client device across the wide area network to the second user client device.

14. The computer readable medium as set forth in claim 13, further comprising:
    storing, as part of the access information, a user share group that identifies one or more users of one or more user client devices, authorized to access one or more data files of the first user;
    determining, at the management server, from the access information whether a second user client device is a part of a user share group;
    if the second user client device is a part of the user share group,
    accessing the first user client device through the wide area network; and
    directing that one or more data files of the first user be transmitted peer-to-peer from the first user client device across the wide area network to the second user client device.

15. The computer readable medium as set forth in claim 13, further comprising:
    generating a shared folder at the first user client device that identifies a plurality of data files of the first user and specifies the user share group.

16. The computer readable medium as set forth in claim 13, further comprising:
    receiving a request to upload remote data from the second user client device to the first user client device; and
    transmitting the remote data from the first user client device for storage on the data storage device.

17. The computer readable medium as set forth in claim 13, wherein accessing the first user client device through the wide area network comprises accessing a data storage device through the first user client device.

18. The computer readable medium as set forth in claim 13, further comprising:
    receiving information from a guest user that does not provide a username and password for accessing files on the first user client device;
    receiving information from a registered user that provides a username and password;
    allowing the guest user to access a first set of files on the first user client device; and
    allowing the registered user to access the first set and a second set of files on the second user client device.

* * * * *